United States Patent [19]

Wade et al.

[11] Patent Number: 4,591,975
[45] Date of Patent: May 27, 1986

[54] DATA PROCESSING SYSTEM HAVING DUAL PROCESSORS

[75] Inventors: Donald A. Wade, Westboro; Eric M. Wagner, Douglas; Lawrence L. Krantz, Marlborough; R. W. Goodman, Hopkinton, all of Mass.

[73] Assignee: Data General Corporation, Westboro, Mass.

[21] Appl. No.: 515,089

[22] Filed: Jul. 18, 1983

[51] Int. Cl.⁴ .......................... G06F 13/00; G06F 3/00
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,242,467 | 3/1966 | Lamy | 364/200 |
| 3,715,729 | 2/1973 | Mercy | 364/200 |
| 3,810,114 | 5/1974 | Yamada et al. | 364/200 |
| 4,096,571 | 6/1978 | Vander Mey | 364/200 |
| 4,099,233 | 7/1978 | Barbagelata et al. | 364/200 |
| 4,123,794 | 10/1978 | Matsomoto | 364/200 X |
| 4,164,787 | 8/1979 | Aranguren | 364/200 |
| 4,223,380 | 9/1980 | Antonaccio et al. | 364/200 |
| 4,257,095 | 3/1981 | Nadir | 364/200 |
| 4,402,046 | 8/1983 | Cox et al. | 364/200 |
| 4,472,771 | 9/1984 | Bienvenu et al. | 364/200 |
| 4,484,275 | 11/1984 | Katzman et al. | 364/200 |

*Primary Examiner*—Raulfe B. Zache
*Assistant Examiner*—William G. Niessen
*Attorney, Agent, or Firm*—Robert L. Dulaney

[57] ABSTRACT

A data processing system having a host processor and an attached processor is disclosed. Each processor is capable of executing user programs under a different operating system and each processor is capable of accessing system memory but the host processor controls and performs all input and output operations for both processors. System memory is shared by the processors, therefore, only one processor is active on the bus system at any given time. Apparatus is disclosed for holding the host processor and starting the attached processor upon a command from the host and apparatus is disclosed for holding the attached processor and starting the host in the event of interrupt conditions, attempted access by the attached processor to protected areas of memory, or execution of an "out" instruction by the attached processor. Memory mapping apparatus which is under host control, but provides mapping for both the host and attached processors is shown.

9 Claims, 40 Drawing Figures

DATA PROCESSING SYSTEM HAVING DUAL PROCESSORS

BACKGROUND OF THE INVENTION

1. Field of the Invention

The invention relates generally to data processing systems and, more particularly, to systems having a plurality of coupled processors utilizing different operating systems.

2. Description of the Prior Art

Many manufacturers of digital computer hardware and software, for example Data General Corporation of Westboro, Mass., have designed and developed proprietary operating system software for use in conjunction with their computer products. Any application software which is designed to run on such a company's computers must be compatible with that company's operating system. Software designed to operate under a different operating system must be modified to make it compatible. Such modifications are potentially time consuming and costly. The use of proprietary operating system software therefore limits the ability of owners of computer hardware using such proprietary operating systems to take advantage of widely available, but incompatible, applications software programs.

The availability of low cost, powerful microprocessors has led to the proliferation of microprocessor-based data processing systems. These systems constitute a large market for application software programs. Virtually all applications software programs must be designed to run under the control of a specific operating system, which serves to interface the application program to the processor and perform various system functions. One popular microprocessor, for example, is the Intel 8086, which runs the CP/M 86 operating system. In the past, however, a computer user who has invested substantial resources in computer hardware and software of a computer manufacturer using a proprietary operating system has typically been required either to purchase a separate microprocessor-based system or convert the software to be compatible with the proprietary operating system in order to utilize the various software products available.

Accordingly, a single system which is capable of running both a proprietary operating system and a popular operating system, such as CP/M 86, allows a computer hardware user to use his library of proprietary operating system related programs and still take advantage of the variety of programs which are available under another operating system.

SUMMARY OF THE INVENTION

The present invention relates to a data processing system having a plurality of processors and having novel structure for controlling which processor is active on the bus system. Each processor shares the same memory space and, therefore, only one processor is active on the bus at any given time. In a preferred embodiment, each processor is capable of executing programs under a different operating system, but one processor, termed the host, controls all input and output operations. Apparatus to control data/address paths and to start and hold each processor in accordance with various system or processor commands and conditions is provided.

It is another feature of the present invention that memory mapping for all processors is controlled by the host processor.

It is yet another feature of the present invention that the host processor can protect certain areas of system memory from access by other processors and can regain control of the bus system if an attempt to access to such an area is made by another processor.

It is an advantage of the present invention that applications software designed to run under a plurality of operating systems can be executed in a single integrated system.

Other features and advantages of the present invention will be understood by those of ordinary skill in the art after referring to the detailed description of the preferred embodiment and drawings herein.

DESCRIPTION OF THE PREFERRED EMBODIMENT

FIG. 1.

Figure 1:
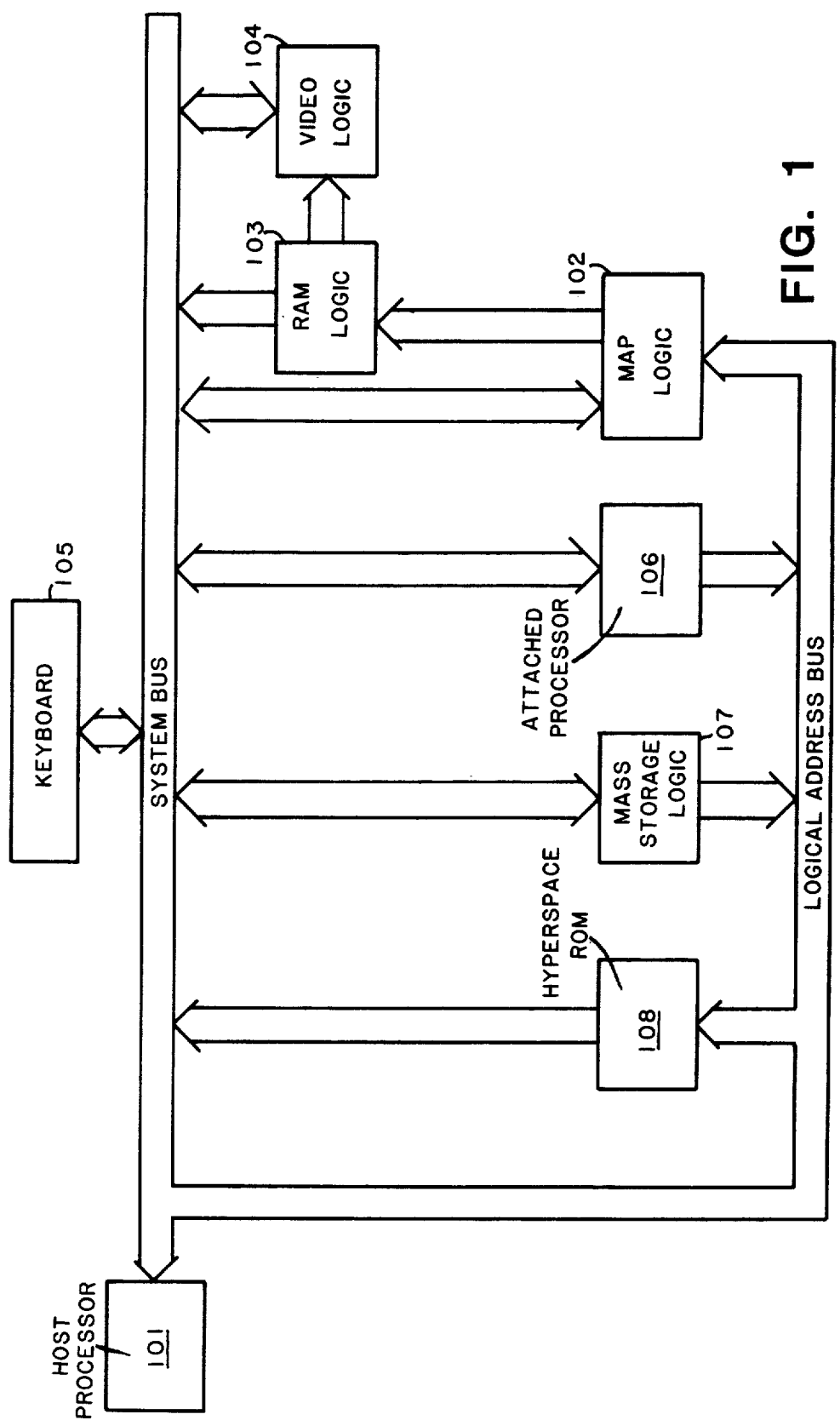
FIG. 1 shows a simplified block diagram of a dual processor data processing system.

Referring to FIG. 1, a simplified block diagram of a data processing system is shown. The system contains a first processor, identified as host processor 101 (HP 101), and a second processor, identified as attached processor 106 (AP 106). The processors and other system elements are interconnected by a bus system which, for the purposes of this description, can be considered as consisting of a system bus and a logical address bus.

Map logic 102 can receive addresses over the logical address bus from HP 101, AP 106 or mass storage logic 107. Map logic 102 generates an addess in physical memory, RAM logic 103, corresponding to the logical address received over the logical address bus. Data from RAM logic 103 is supplied directly to video logic 104 or over the system bus to HP 101, AP 106, mass storage logic 107 or keyboard 105. Hyperspace ROM 108 is a memory system which provides a variety of capabilities such as power-up diagnostics, bootstraps from the mass storage device, emulated instructions, certain virtual console functions, character bit-maps for error codes which occur during the power-up procedure, and a display/keyboard emulator. Hyperspace ROM 108, when activated, receives address information from HP 101 over the logical address bus and provides data on the system bus in response to the address received. The system bus also transfer addresses and data between HP 101 and keyboard 105, video logic 104, map logic 102, AP 106 and mass storage logic 107.

As will be discussed in more detail below, the flow of addresses and data among the functional elements in FIG. 1 is controlled by a set of control signals. HP 101 and AP 106 share system memory, and therefore both HP 101 and AP 106 cannot be operating and in control of the bus system at the same time. In the embodiment disclosed, HP 101 is in control of all input/output operations and certain communication paths and control functions are available only to it.

FIG. 2

Figures 1, 2:
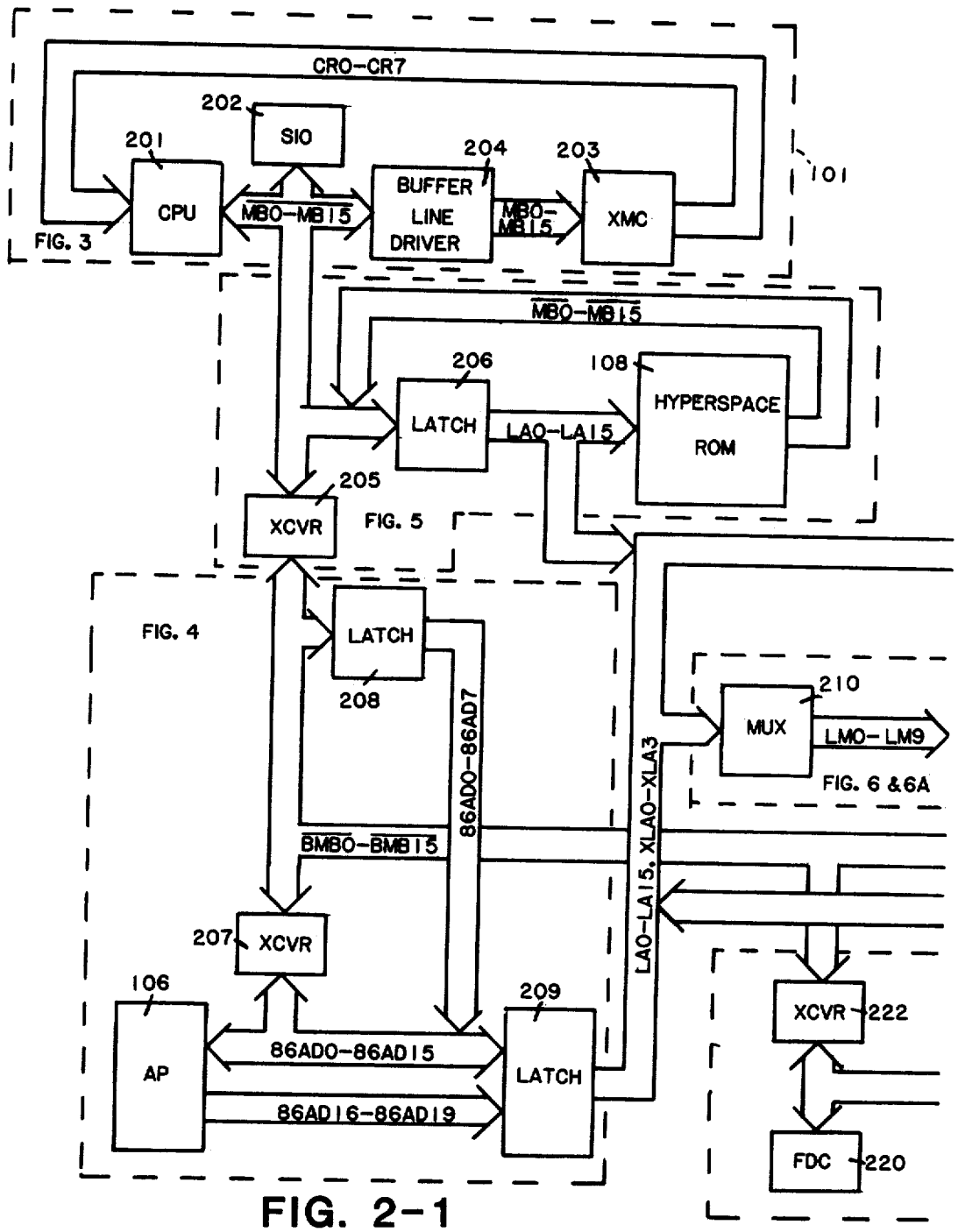
FIG. 2 shows a more detailed block diagram of the data processing system of FIG. 1.
Figure 2:
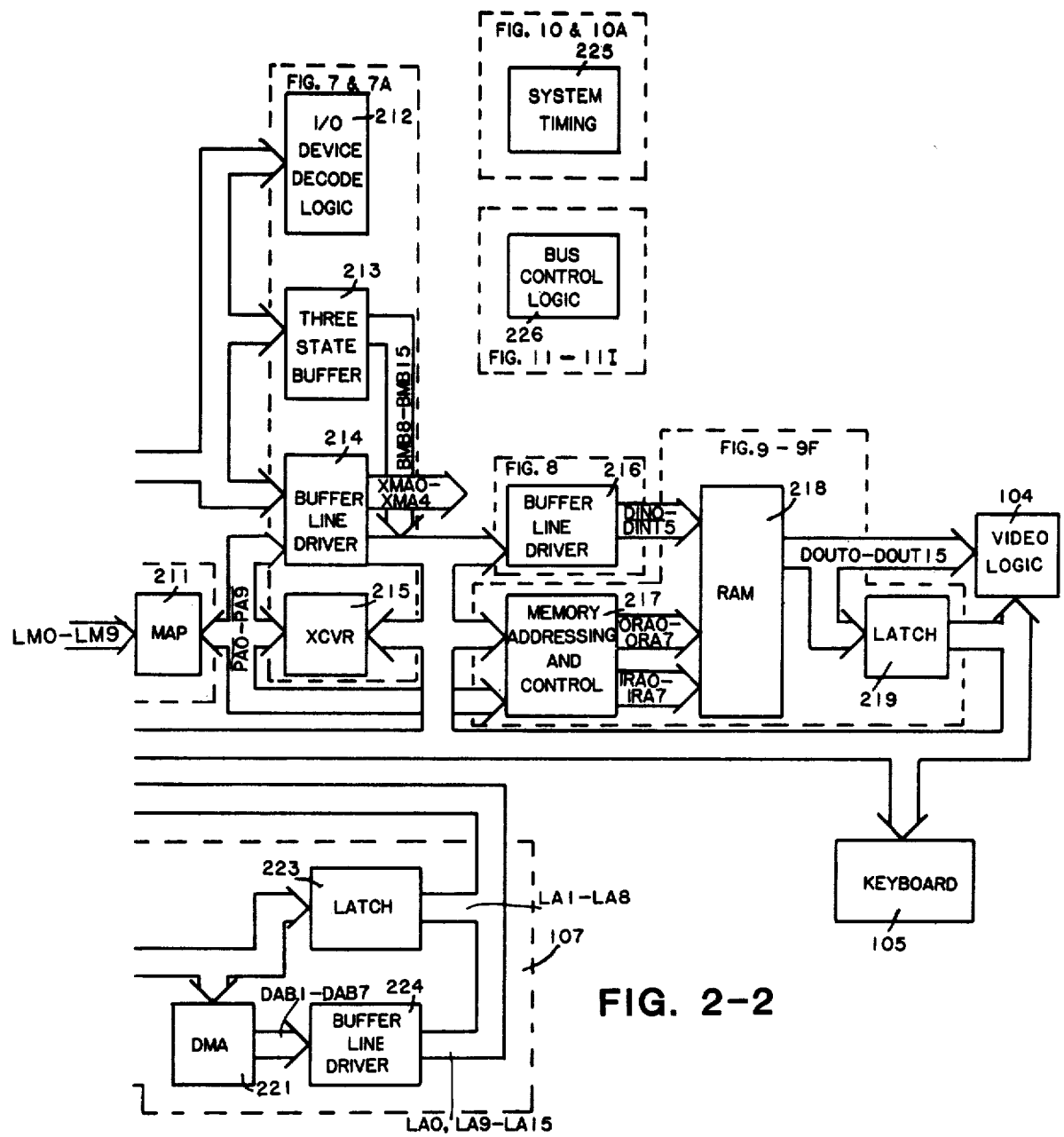

A more detailed block diagram of the system of FIG. 1 is shown in FIG. 2. In an exemplary embodiment, HP 101 contains CPU 201, SIO (system input/output) 202 and XMC (extended microcontroller chip) 203 which are interconnected via the system bus. Such an integrated circuit set is manufactured by Data General Corporation and is described in various documents and publications of that company and also in U.S. Pat. No. 4,371,925. While the preferred embodiment of the invention disclosed herein uses the integrated circuit chip set identified above, it will be understood by those knowledgeable in the art that the invention is not limited to this embodiment and various other processors can be used as HP 101.

FIG. 2 is intended to show the various data and address paths among the functional elements of the system. Certain paths are bidirectional, in that data/addresses are received and transmitted over the same lines, while certain paths are unidirectional. Arrows indicate the general direction of data/address flow over the 16-bit parallel bus system. As mentioned above, the specific data/address path which is enabled at any given time during the operation of this system is controlled by various signals and control means not shown in FIG. 2, but discussed in more detail below in regard to FIGS. 3-11.

SIO 202 provides a variety of capabilities including providing the complete 16-bit parallel ECLIPSE® I/O bus and the byte serial microNOVA® I/O bus; monitoring the system bus for I/O instructions from the CPU; taking control of the system bus to handle data channel requests from either of the I/O busses; providing the function of common peripheral devices such as the real time clock, asynchronous communications interface, power monitor and programmable interval timer; and maintaining a number of system configuration status signals. XMC 203 contains a number of vertical microinstructions, a decode PLA for identifying macroninstruction opcodes and a vertical sequencing mechanism. More than one XMC chip may be connected to the system bus to provide a greater number of external microinstructions. XMC 203 sends sixteen bits of microcode (CR0-CR7) to CPU 201 using an 8-bit time-multiplexed bus. Transfers of microcode are sequenced by control signals passing between XMC 203 and CPU 201.

$\overline{\text{MB0-MB15}}$ supply signals which may represent addresses, data or I/O control information to latch 206 and via buffer line drivers 204 to XMC 203. $\overline{\text{MB0-MB15}}$ may be supplied to or received from CPU 201, SIO 202 or transceiver 205. If $\overline{\text{MB0-MB15}}$ contains address information, latch 206 will provide address signals LA0--LA15 to hyperspace ROM 108, multiplexer 210, buffer line driver 214, I/O device decode logic 212 and three-state buffer 213. AP 106 transmits addresses or data over lines 86AD0-86AD15 to transceiver 207 and latch 209. Latch 209 also receives extended address bits 86AD16-86AD19. Data is received by AP 106 from transceiver 207 and latch 208. Latch 209, when enabled, supplies address bits LA0-LA15 to multiplexer 210, I/O device decode logic 212, three-state buffer 213 and buffer line driver 214. Multiplexer 210 also receives extended address bits XLA0-XLA3. Multiplexer 210 in response to an address from either latch 206 or latch 209 provides address bits LM0-LM9 to MAP 211, which in turn, provides physical address bits $\overline{\text{PA0-PA9}}$ to buffer line drivers 214, transceiver 215 and memory addressing 217. Three-state buffer 213, transceiver 215 and buffer line drivers 214 provide addresses over lines $\overline{\text{BMB0-BMB15}}$. Data input bits $\overline{\text{DIN0-DIN15}}$ are provided to RAM 218 from buffer line drivers 216. Memory addressing and control 217 receives address information over $\overline{\text{BMB0-BMB15}}$ and generates row/column addresses and various control signals to RAM 218. Transceivers 205, 207 and 215, video logic 104, keyboard 105 and mass storage logic 107 both receive and transmit information over $\overline{\text{BMB0-BMB15}}$.

In this embodiment, mass storage logic 107 is constructed of transceiver 222, FDC (floppy disk controller) 220, DMA (direct memory access) logic 221, latch 223, buffer line driver 224 and control logic (not shown). FDC 220, for example an NEC uPD765 or Intel 8272 floppy diskette controller chip, controls data transfers to and from the floppy disk and may request and exercise control over the system and logical address bus. DMA 221, for example an Intel 8257, is under the control of FDC 220. Address information is supplied to the logical address bus via latch 223 and buffer line driver 274. Transceiver 222 receives and transmits address, data and control information via the system bus. RAM 218 provides output data bits $\overline{\text{DOUT0-DOUT15}}$ to video logic 104 and latch 219. Video logic 104 contains video timing circuitry, shift registers for providing display data to the system monitor and a CRT controller, for example a Motorola 6845, which receives and transmits over $\overline{\text{BMB8-BMB15}}$. Finally, system timing 225 provides a number of timing signals used throughout the system and bus control logic 226 generates the specific signals necessary to control bus access and address/data flow.

FIG. 3

Figures 1, 3:
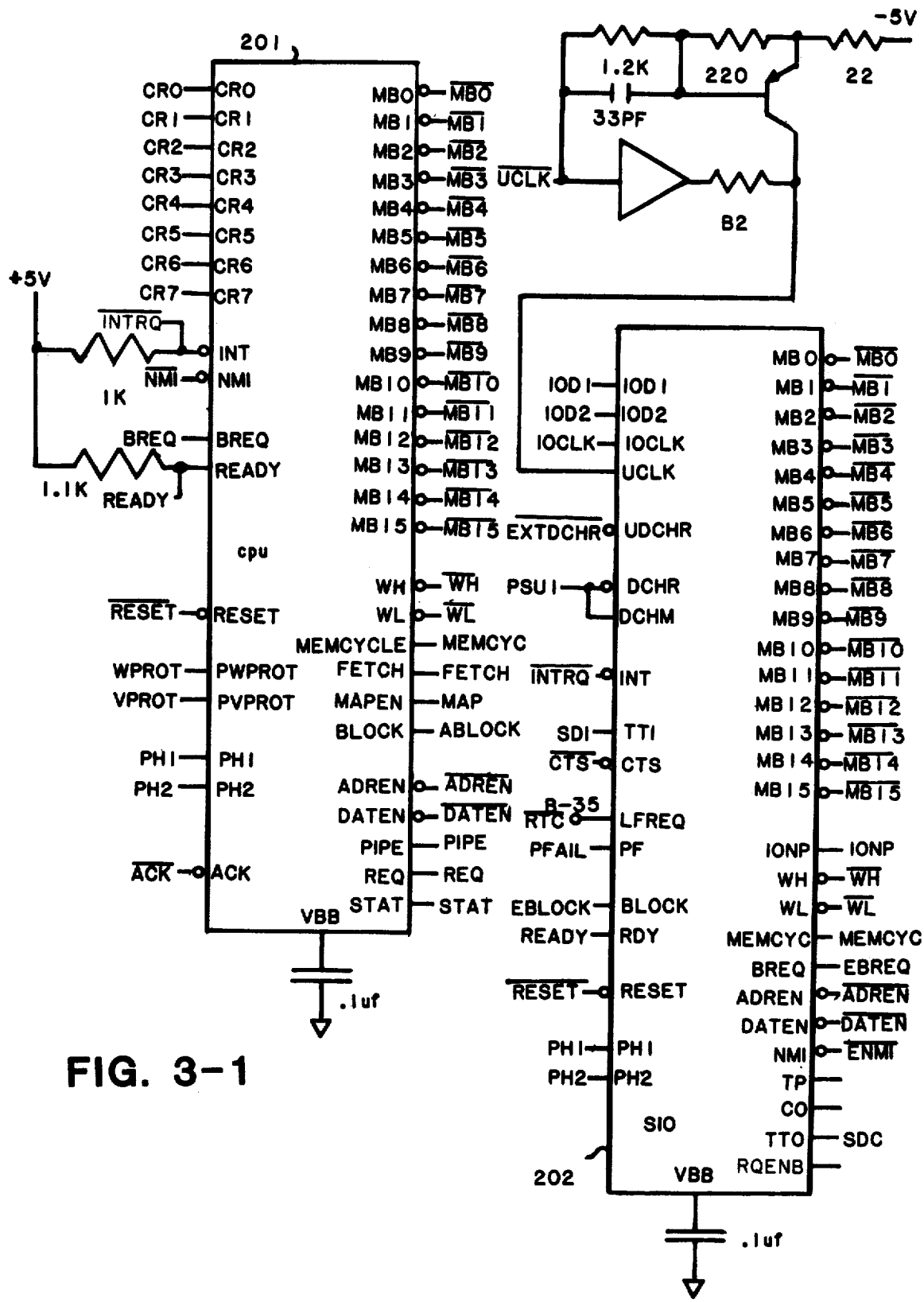
FIG. 3 shows specific logic circuitry for implementing host processor 101.
Figures 2, 3:
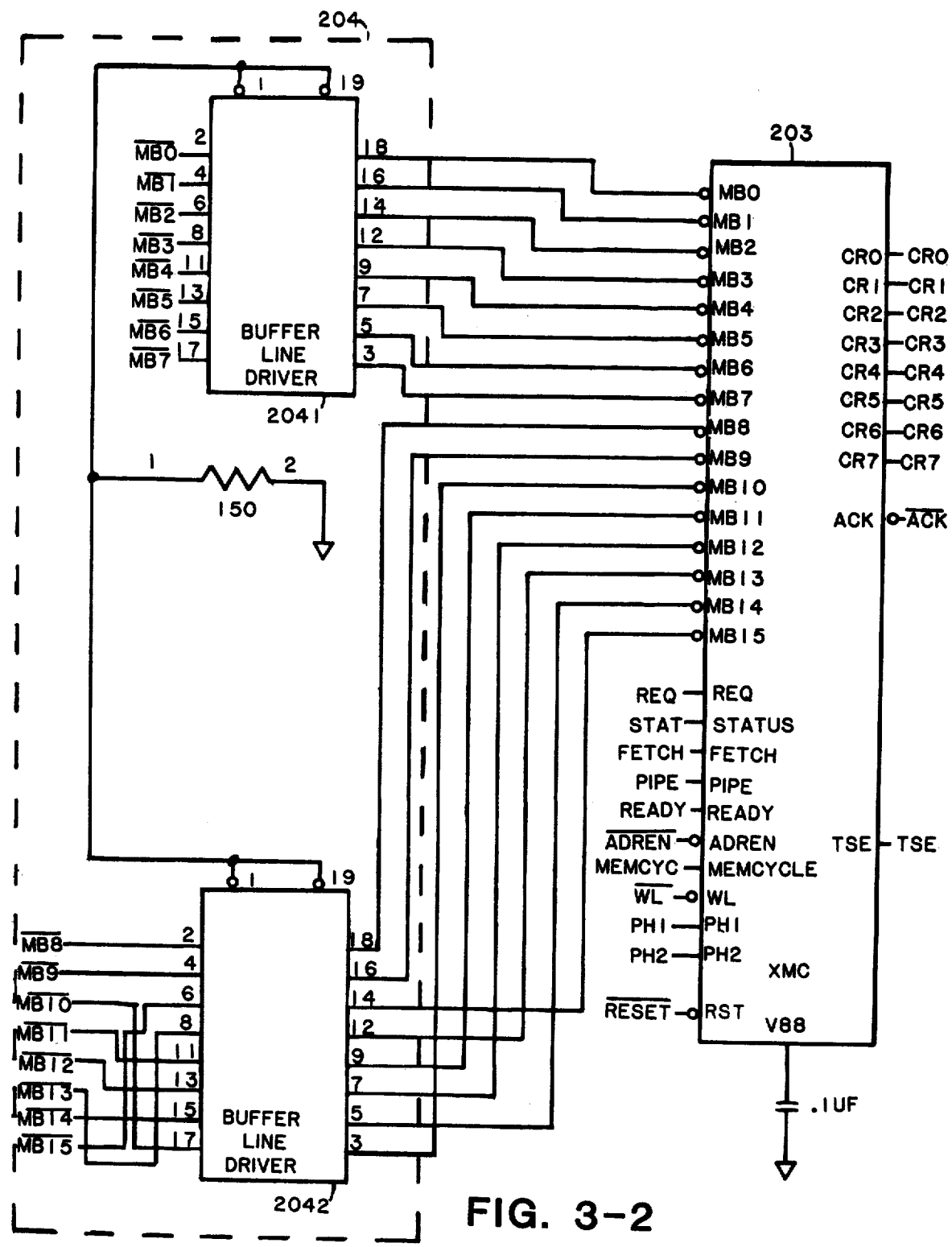

FIG. 3 shows specific circuitry for implementing host processor 101 using CPU 201, SIO 202 and XMC 203 integrated circuits of the type identified above. Looking first at CPU 201, $\overline{\text{MB0-MB15}}$ transfer addresses, I/O control information and data to and from CPU 201. If $\overline{\text{ADREN}}$ (address enable) is asserted low, CPU 201 is supplying either a memory address or an I/O command on $\overline{\text{MB0-e,ovs/MB/ 15}}$. MEMCYC high indicates a memory address while MEMCYC low indicates an I/O command. If $\overline{\text{DATEN}}$ (data enable) is asserted low, CPU 201 is supplying memory or I/O data. The direction of the transfer when $\overline{\text{DATEN}}$ is low is indicated by the state of $\overline{WH}$ (write high byte) and $\overline{WL}$ (write low byte), as held in latch 501, discussed below. If $\overline{WH}$ and $\overline{WL}$ are both high, a read operation is underway. FETCH high indicates that the operation in progress is the fetching of an instruction from memory. MAP (mapping enable) high indicates that logical addresses from CPU 201 or data channel logical addresses from FDC 220 are to a be translated into physical addresses by map logic 102. ABLOCK (CPU 102 bus lock) high indicates CPU 201 is inhibiting access to RAM 218 by any other device until the current memory operation is completed. PIPE relates to the status of the internal CPU 201 instruction registers.

PH1 (clock phase 1) and PH2 (clock phase 2) are provided as alternating, non-overlapping clock signals. The system bus is time-multiplexed and CPU 102, SIO 103 and XMC 103 are synchronized by these two externally generated clock signals. In a preferred embodiment PH1 and PH2 are each high for approximately 200 nanoseconds. If $\overline{ADREN}$ is asserted low while PH1 is high, the system bus is used to select one of four address spaces (program memory, console memory, I/O operations or local communications), the logical address within that address space and the direction and length of the data transfer. MEMCYC and $\overline{MB0}$ are used to identify the specific address space. When PH2 goes high, $\overline{MB0}$-$\overline{MB15}$ contain the data to be transferred. $\overline{DATEN}$ low indicates valid write data is available on the system bus. READY low indicates that the data transfer underway cannot be completed in the time available and must be extended for additional PH2 periods. It can be seen that $\overline{ADREN}$ and $\overline{DATEN}$ serve as interlocks to prevent addresses or data from being driven onto the bus at the wrong time.

REQ, STAT and ACK are related to the control of XMC 103 by CPU 201. WPROT (write protected page) high indicates that a section of memory which is write protected has been accessed. VPROT (validity protection fault) high indicates that an access to a section of memory which is validity protected has been requested. $\overline{RESET}$ low initializes the internal logic of CPU 201. BREQ (bus request) high indicates that a system element, other than CPU 201, wants control of the system bus. In the current embodiment, there are four elements which may have control over the bus: CPU 201, SIO 202, AP 106 and FDC 220. The bus will be granted at the following PH1 pulse if ABLOCK is low and READY is high.

$\overline{NMI}$ (non-maskable interrupt) low forces CPU 201 to enter an interrupt sequence. $\overline{INTRQ}$ (interrupt) low indicates that the processor should enter an interrupt sequence if interrupts are enabled at that time. Finally, CR0-CR7 act as a microcode transfer bus to supply microcode from XMC 203 to CPU 201.

Looking now at SIO 202, the signals not already discussed in regard to CPU 201 will be briefly defined. As stated above, SIO 202 handles the interface between the system bus and the ECLIPSE® and microNOVA® buses (not shown), IONP, IOD1, IOD2, IOCCK, UDCHR and UCLK control transfers to and from the microNOVA bus. TTO is the asynchronous serial output line. TTI is the asynchronous serial input line. PF high, from the system power supply (not shown), indicates that the AC line power is correct. LFREQ (AC line frequency) is used as a timing reference by the SIO 202 internal clock. $\overline{CTS}$ (clear to send) high inhibits transmissions to TTO devices. DCHR (data channel request) low indicates a device on the ECLIPSE® bus is requesting a data channel transfer. DCHR is held high in this embodiment, since the ECLIPSE bus is not used. DCHM (data channel mode) indicates whether the data channel sequence is an input (DCHM high) or an output (DCHM low) sequence. DCHM is held high in this embodiment. EBLOCK (SIO bus lock) high indicates the bus is unavailable.

$\overline{MB0}$-$\overline{MB15}$ are also supplied via buffer line drivers 2041 and 2042 to XMC 203. All inputs and outputs of XMC 203 have been described above with the exception of TSE, which is used to assure that no two XMC's try to drive the microcode transfer bus simultaneously when additional XMC's (not shown) are added to the system.

FIG. 4

Figures 1, 4:
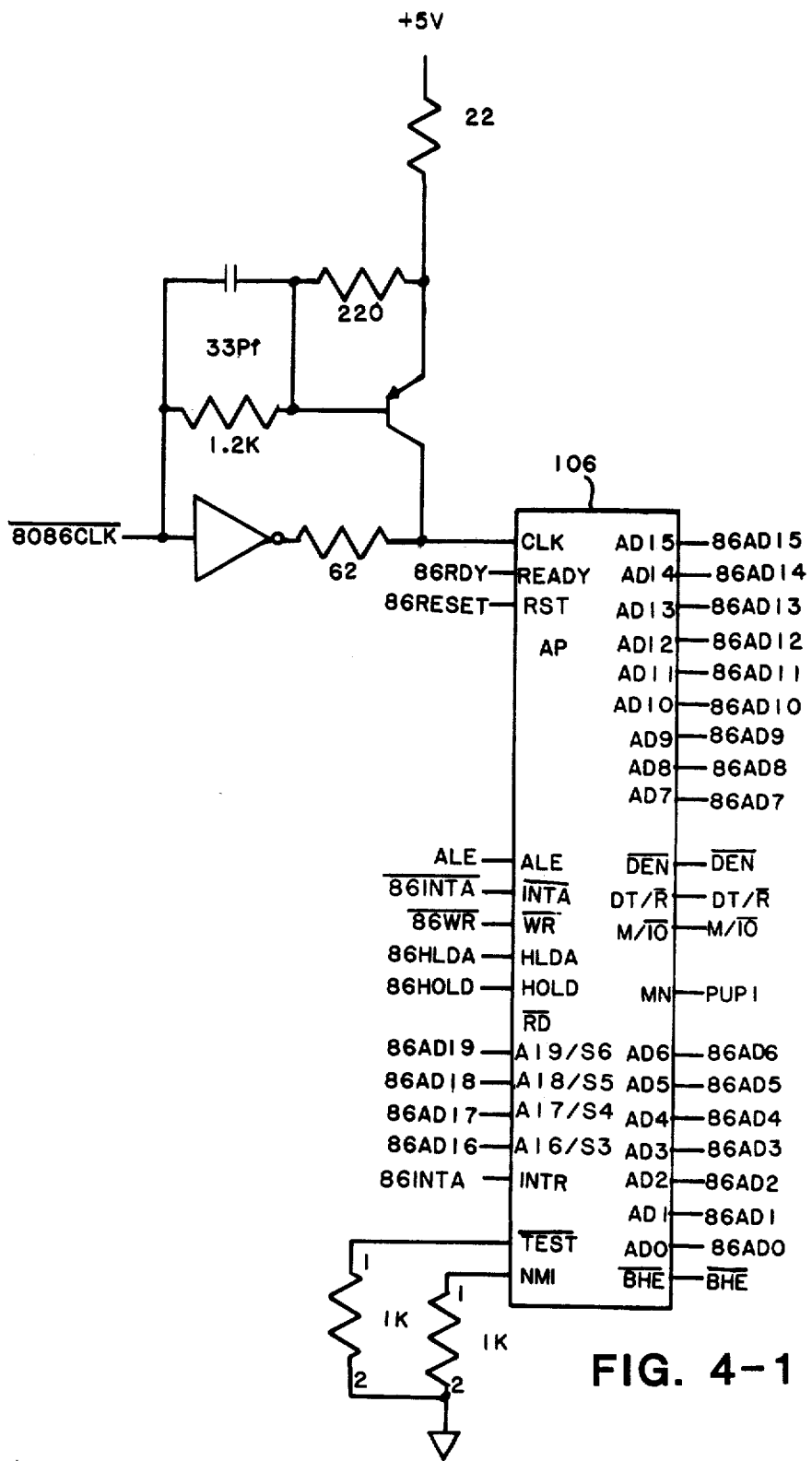
FIG. 4 shows specific logici circuitry for implementing attached processor 106, transceiver 207, latch 208 and latch 209.
Figures 2, 4:
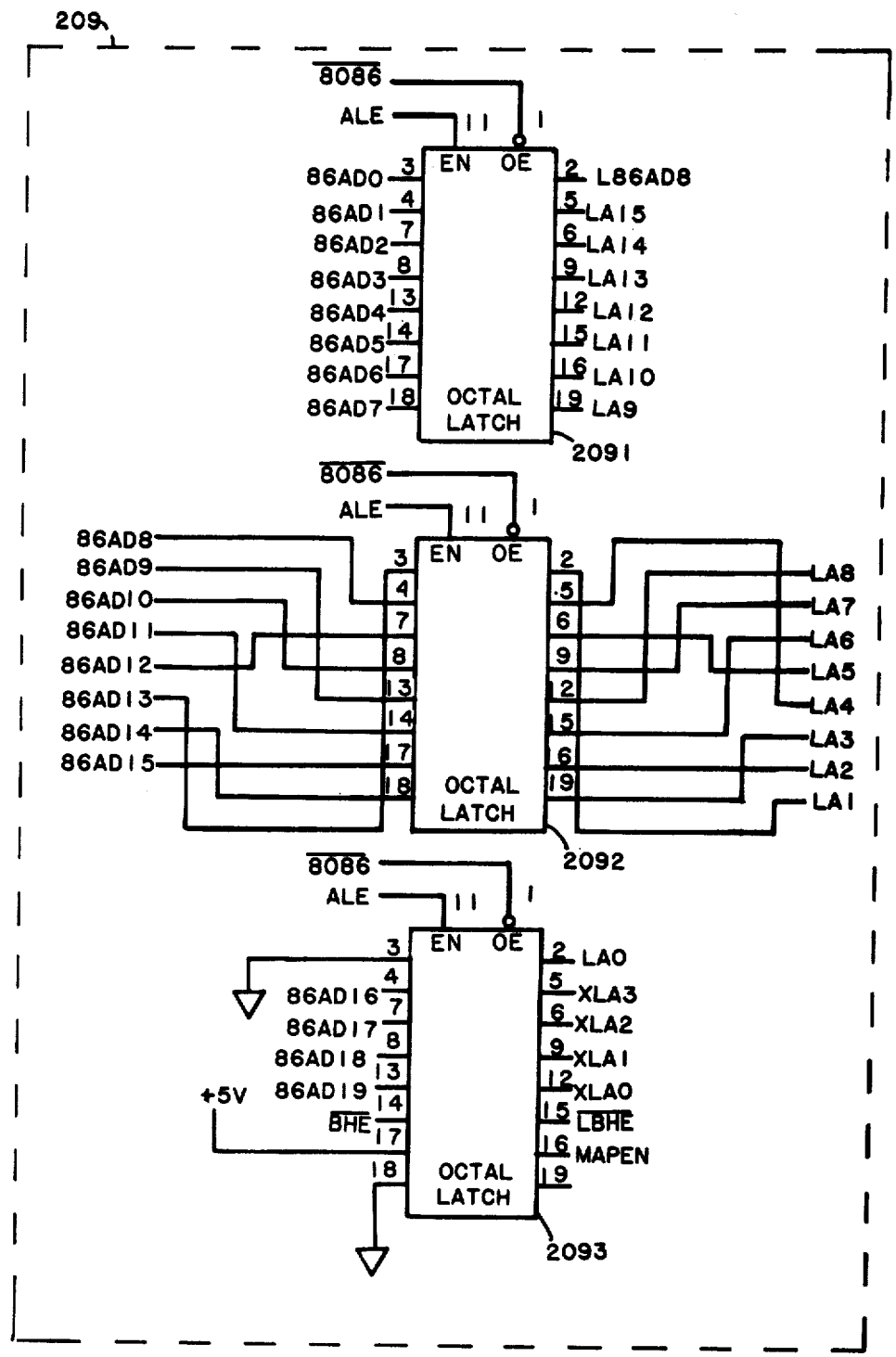
Figures 3, 4:
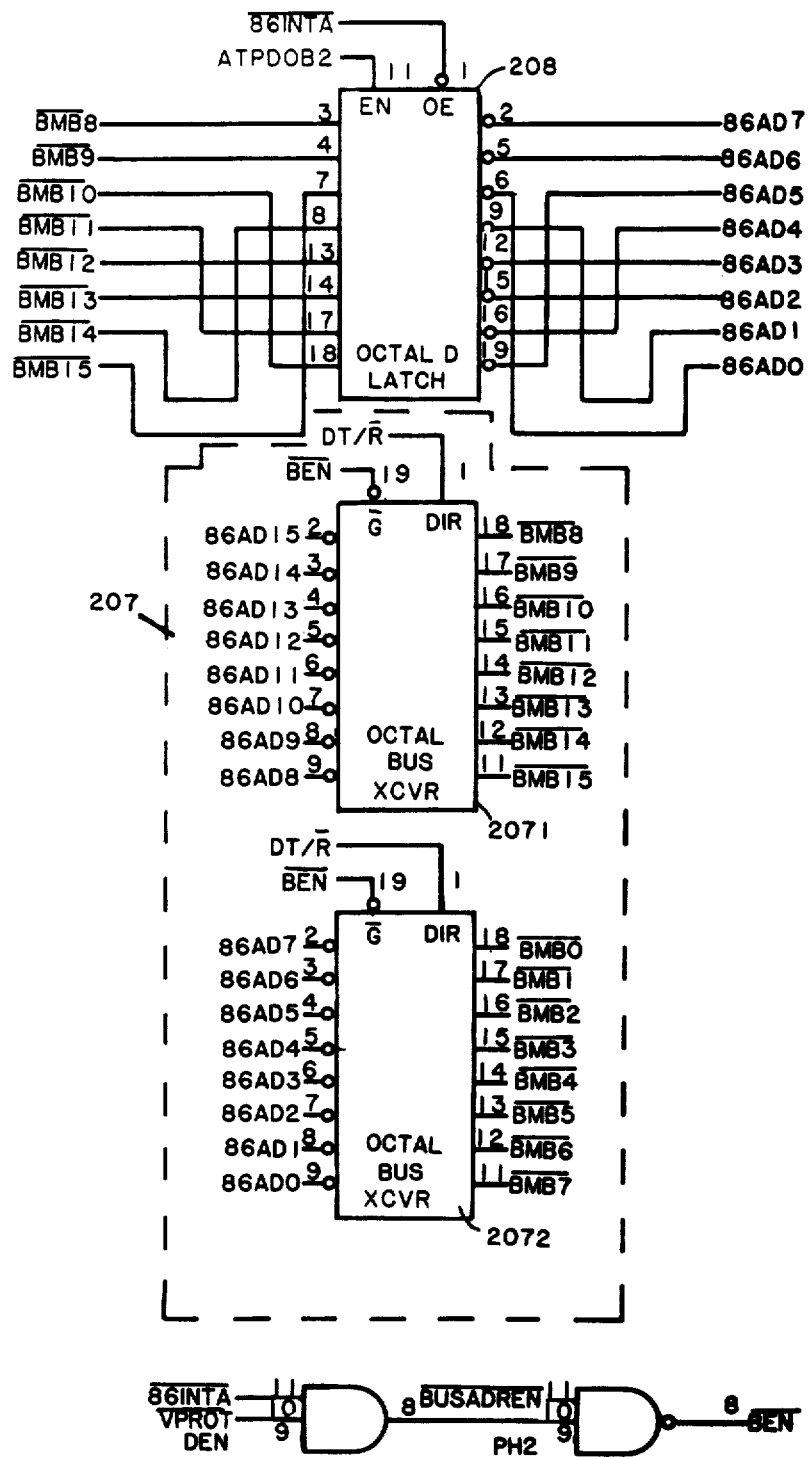

FIG. 4 shows an apparatus for implementing AP 106, transceiver 207, latch 208 and latch 209. In this embodiment, AP 106 is an Intel 8086 16-bit HMOS microprocessor. Persons of ordinary skill in the art will appreciate that this is only one of a number of other commercially available processors which could be used in this invention. Referring now to the inputs and outputs of AP 106, 86AD0-86AD15 provide addresses and data to and from AP 106. These lines are time-multiplexed such that address and data information do not appear on the 86AD0-86AD15 bus simultaneously. During the address time phase, 86AD0 serves to indicate whether a byte is to be transferred on the lower 8-bits of the bus (86AD0-86AD7) during a memory or I/O operation. During the address time phase, 86AD16-86AD19 are the four most significant address lines for memory operations, but are held low for I/O operations. During the data time phase, 86AD16-86AD19 provide status information for both memory and I/O operations.

$\overline{DEN}$ (data enable) goes low and returns high during each memory and I/O access. DT/$\overline{R}$ (data transmit/receive) indicates the direction of data flow. M/$\overline{IO}$ distinguishes between a memory access and an I/O access. MN is a signal to AP 106 to indicate the AP 106 operating mode. In this embodiment, MN is held high. $\overline{BHE}$ (bus high enable) low enables data onto the most significant 8-bits (86AD8-86AD15) of the data bus. The NMI line is held low, since this function is handled by CPU 201. The $\overline{TEST}$ feature is not used and is held low. 86INTR (interrupt request) high requests that AP 106 enter an interrupt acknowledge operation. 86HOLD high indicates that AP 106 is being requested to enter a hold state. 86HLDA (hold acknowledge) high indicates that AP 106 acknowledges the hold request. 86$\overline{WR}$ low indicates AP 106 is performing a write operation to either memory or I/O, depending on the state of M/$\overline{IO}$. $\overline{86INTA}$ (interrupt acknowledge) low indicates $\overline{86INTR}$ high has been acknowledge by AP 106.

ALE (address latch enable) high indicates that an address is available on the data bus and, therefore, goes high only during the AP 106 address time phase. 86RESET high causes termination of AP 106 activity. Execution is reinitialized when 86RESET returns low. 86RDY low indicates that a memory or I/O transaction has not been completed. CLK provides the basic AP 106 timing. AP 106 is clocked by 8086CLK from a system timing 217.

86AD0-86AD19 and $\overline{BHE}$ are provided from AP 106 to latch 209, implemented in this embodiment as latches 2091-2093. These inputs are latched by ALE from AP 106. Outputs are enabled by $\overline{8086}$ from control logic 218 (FIG. 11A). Therefore, when AP 106 is active, indicated by $\overline{8086}$ low, logical addresses are supplied by latches 2091-2093. ALE from AP 106 will latch the information on 86AD0-86AD19 during the AP 106 address time phase. In addition, when enabled, latch 2093 holds MAPEN (map enable) high and provides $\overline{\text{LBHE}}$ to bus control logic 218 (FIG. 11H).

The 86AD0-86AD15 lines are provided to one side of transceivers 2071 and 2072 and the $\overline{\text{BMB0-BMB15}}$ lines are provided to the other side. Enabling of transceiver 2071 and 2072 is controlled by $\overline{\text{BEN}}$, which is low when addresses are not enabled on the bus, AP 106 is not acknowledging an interrupt, a validity protected memory location is not being accessed, data is enabled on 86AD0-86AD15 by AP 106 and the CPU 201 data transfer phase is active. The direction of data flow through transceivers 2071 and 2072 is controlled by DT/$\overline{\text{R}}$ from AP 106. DT/$\overline{\text{R}}$ high indicates a data transfer from AP 106.

Finally in FIG. 4, AP 106 receives 8 bits of interrupt vector data over 86AD0-86AD7 from latch 208. $\overline{\text{BMB8-BMB15}}$ are latched into 208 by ATPDOB2 high (FIG. 11), indicating CPU 201 is updating the AP 106 interrupt vector and PH2 is active, and outputs are enabled by $\overline{\text{86INTA}}$ low, indicating AP 106 is acknowledging receipt of an interrupt.

FIG. 5

Figures 1, 5:
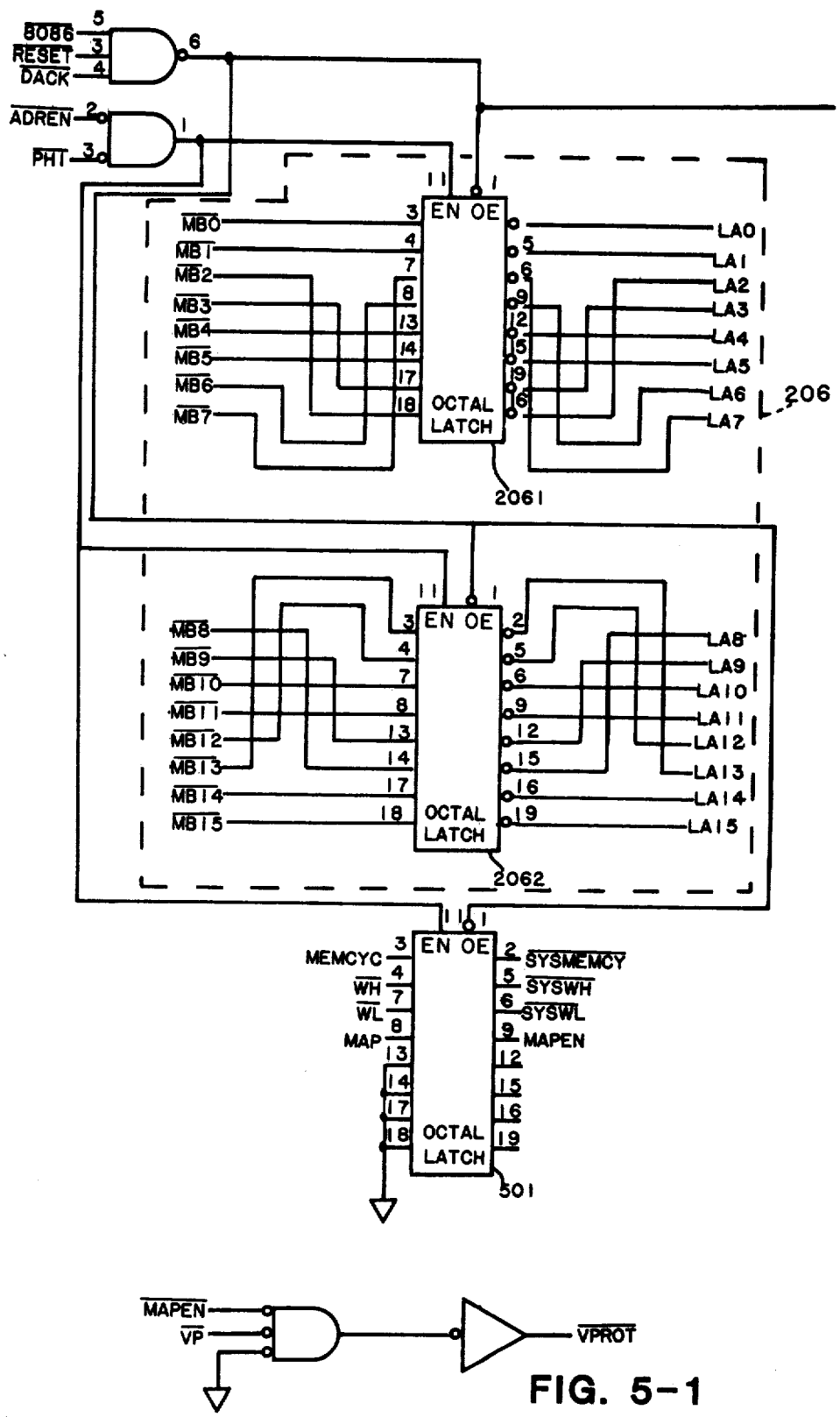
FIG. 5 shows specific logic circuitry for implementing transceiver 205, latch 206, and hyperspace ROM 108.
Figures 2, 5:
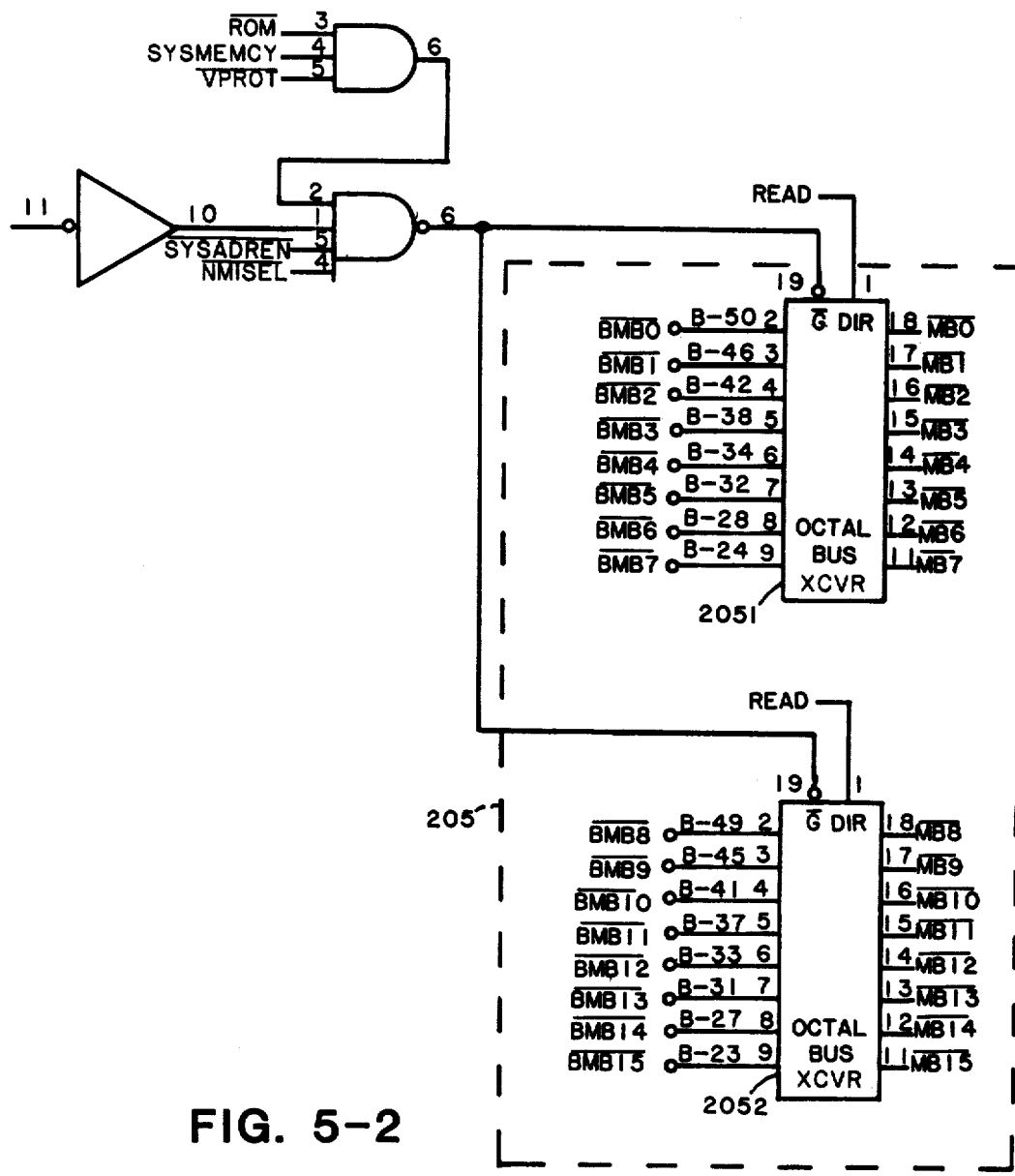
Figures 3, 5:
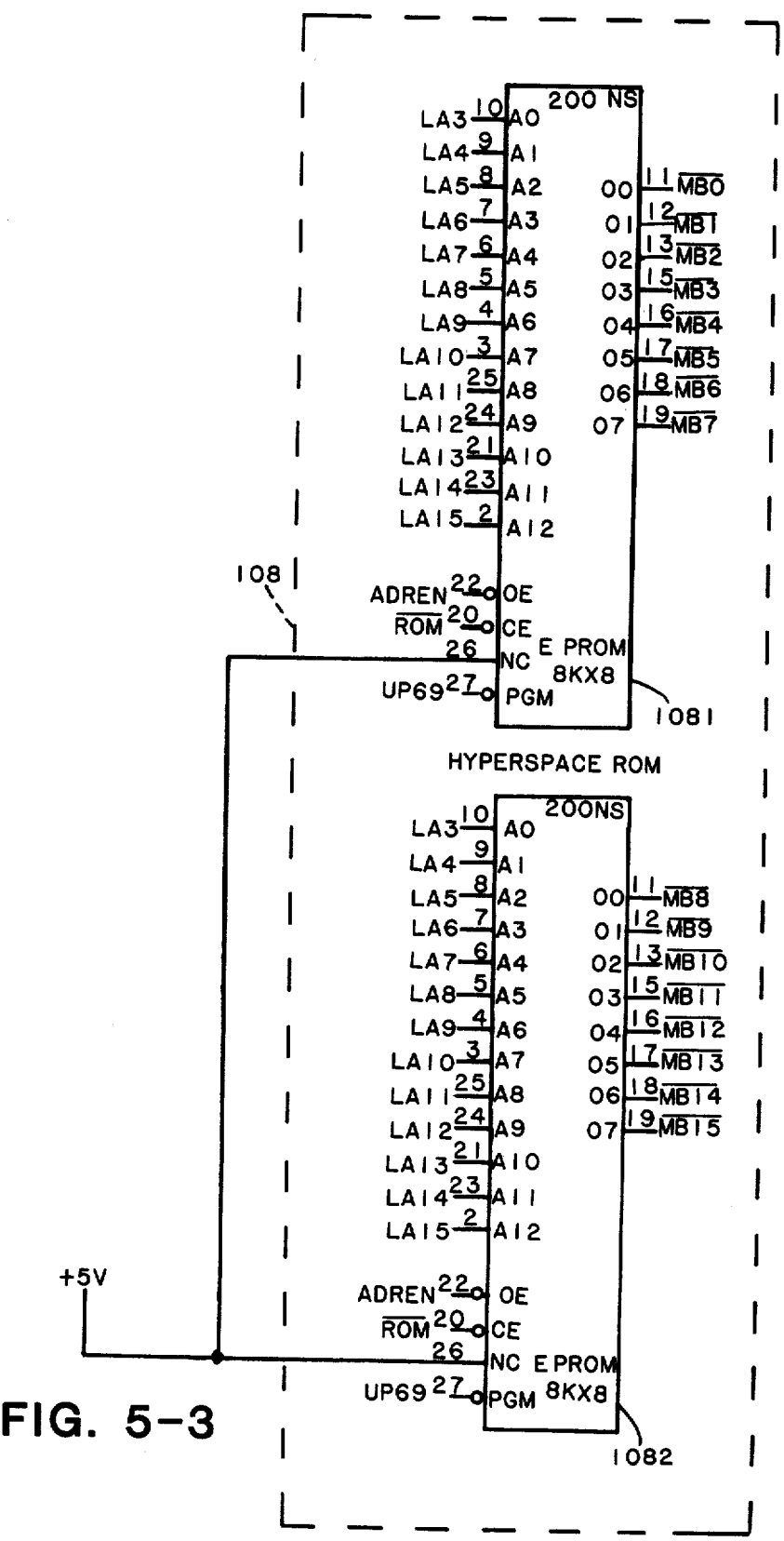

Looking now at FIG. 5, specific logic circuitry for implementing transceiver 205, latch 206 and hyperspace ROM 108 is shown. Latches 2061 and 2062 receive $\overline{\text{MB0-MB7}}$ and $\overline{\text{MB8-MB15}}$ from CPU 201 or SIO 202. Data is enabled into 2061 and 2062 during the PH1 phase by $\overline{\text{ADREN}}$ going low and is latched when $\overline{\text{PH1}}$ goes high. Gating of $\overline{\text{ADREN}}$ with $\overline{\text{PH1}}$ ensures the proper address information is present at latches 2061 and 2062 when latching occurs. Latch 2061 and 2062 outputs are enabled if $\overline{8086}$ is high (indicating AP 106 is not active), a system reset is not requested and $\overline{\text{DACK}}$ high indicates that mass storage logic 107 is not active on the logical address bus. Latch 501 receives MEM-CYC, $\overline{\text{WH}}$, $\overline{\text{WL}}$ and MAP from CPU 201. These signals are latched as SYSMEMCY, $\overline{\text{SYSWH}}$, SYSWL and MAPEN. Latch 501 is controlled by the same latch and enable conditions as latches 2061 and 2062.

Transceivers 2051 and 2052 are connected to $\overline{\text{BMB0-BMB7}}$ and $\overline{\text{BMB8-BMB15}}$ on one side and $\overline{\text{MB0-MB7}}$ and $\overline{\text{MB8-MB15}}$ on the other side. For transceivers 2051 and 2052 to be enabled, several conditions must be met. $\overline{\text{ROM}}$ high, indicating ROM 108 is not enabled; SYSMEMCY high, indicating a memory cycle; $\overline{\text{VPROT}}$ high, indicating the memory address is not validity protected, $\overline{\text{SYSADREN}}$ high, indicating addresses are not enabled on the bus; and $\overline{\text{NMISEL}}$ high from FIG. 7A. In addition, all conditions required to enable latches 2061 and 2062 must also be present. The direction of transceiver 205 is determined by READ indicating whether the operation is a read or a write (FIG. 6A).

Hyperspace ROM 108 is implemented as 8K×8 bit EPROM's 1081 and 1082. Both EPROM 1081 and 1082 receive LA3-LA15 from latches 2061 and 2062. As mentioned above, ROM 108 provides a variety of features such as power-up diagnostics, system bootstraps, limited virtual console, some error code bit maps and a display/keyboard emulator to provide a usable user interface at power-up. In addition, ROM 108 allows a significant reduction in the hardware logic required to support I/O operations by emulating some I/O interface hardware. As discussed below, PAL 2121 (FIG. 7A) monitors LA1 and LA2 and, when they are high along with $\overline{\text{HYPER}}$, generates $\overline{\text{ROMSEL}}$ which results in enabling of ROM 108. ROM 108 then supplies $\overline{\text{MB0-MB15}}$ in response to LA3-LA15 when ADREN is high. As discussed below in regard to FIG. 7A, ROM 108 cannot be accessed by AP 106.

Figures 1, 6:
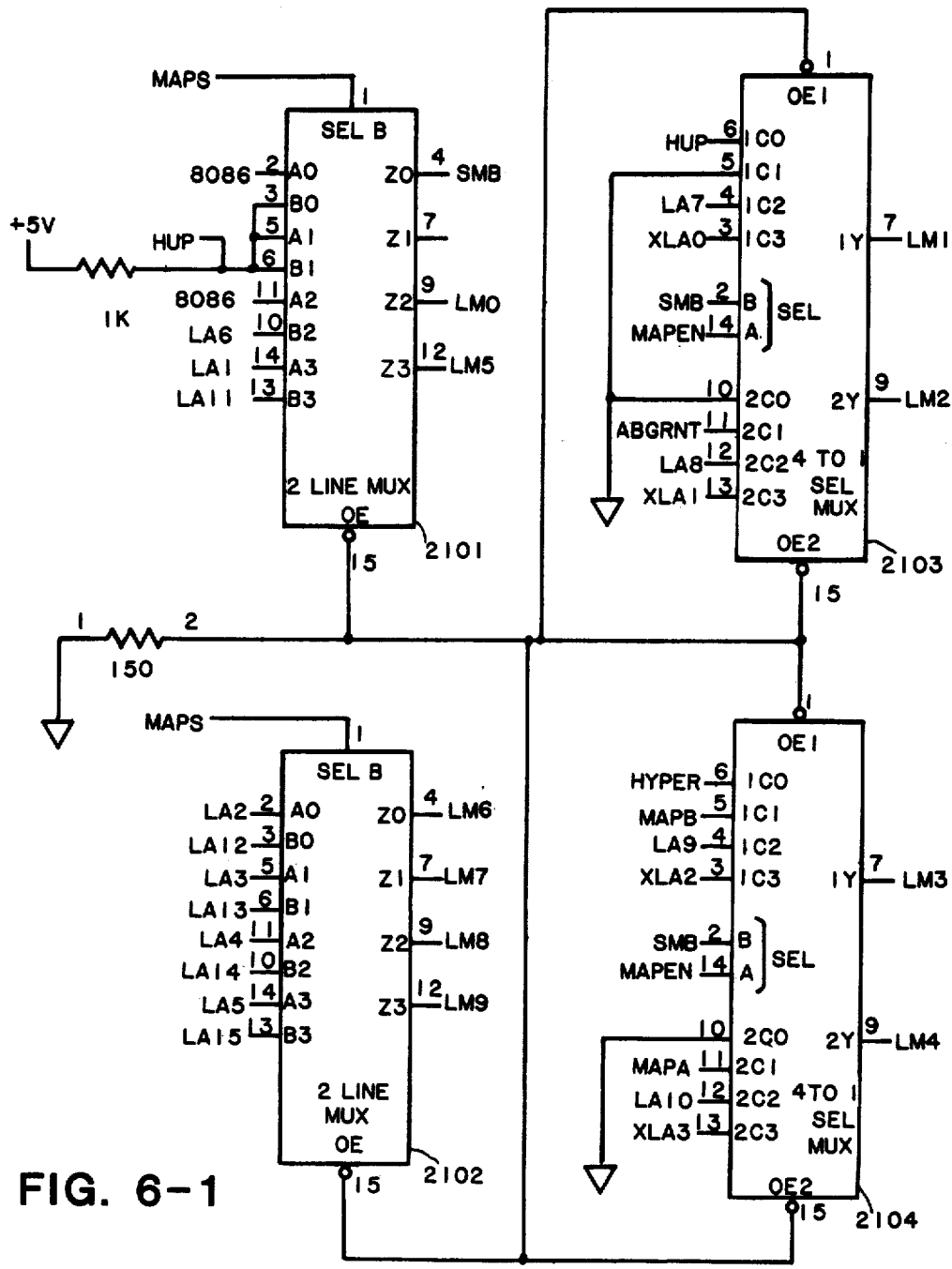
FIGS. 6 and 6A show specific logic circuitry for implementing multiplexer 210 and map 211.
Figures 2, 6:
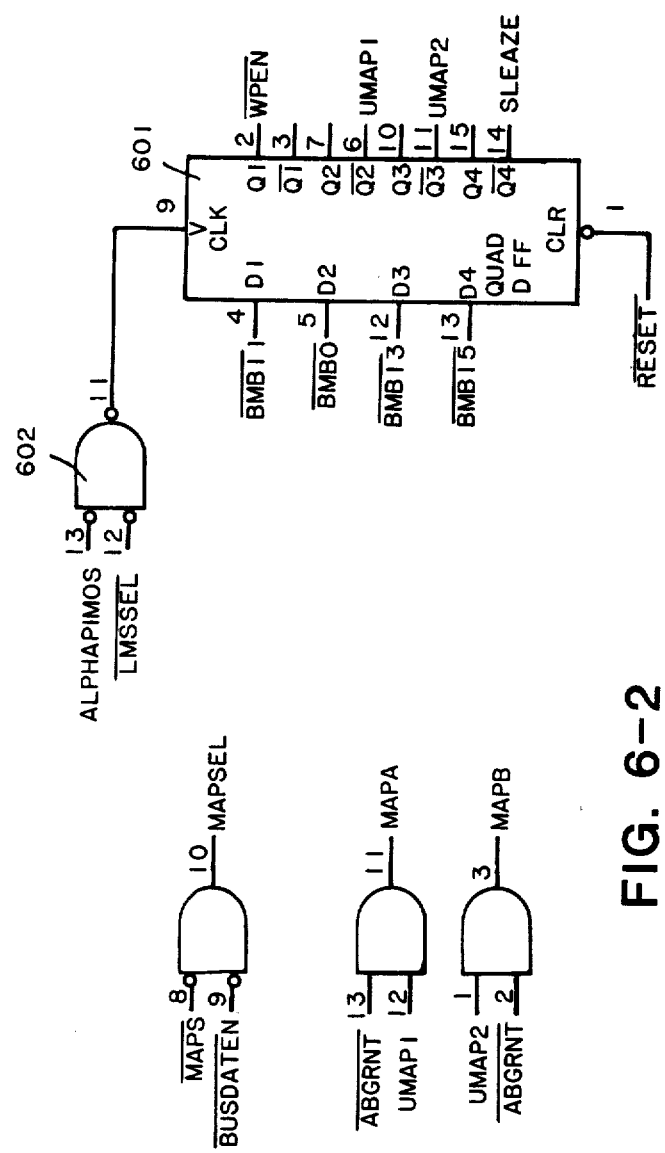
Figure 6A:
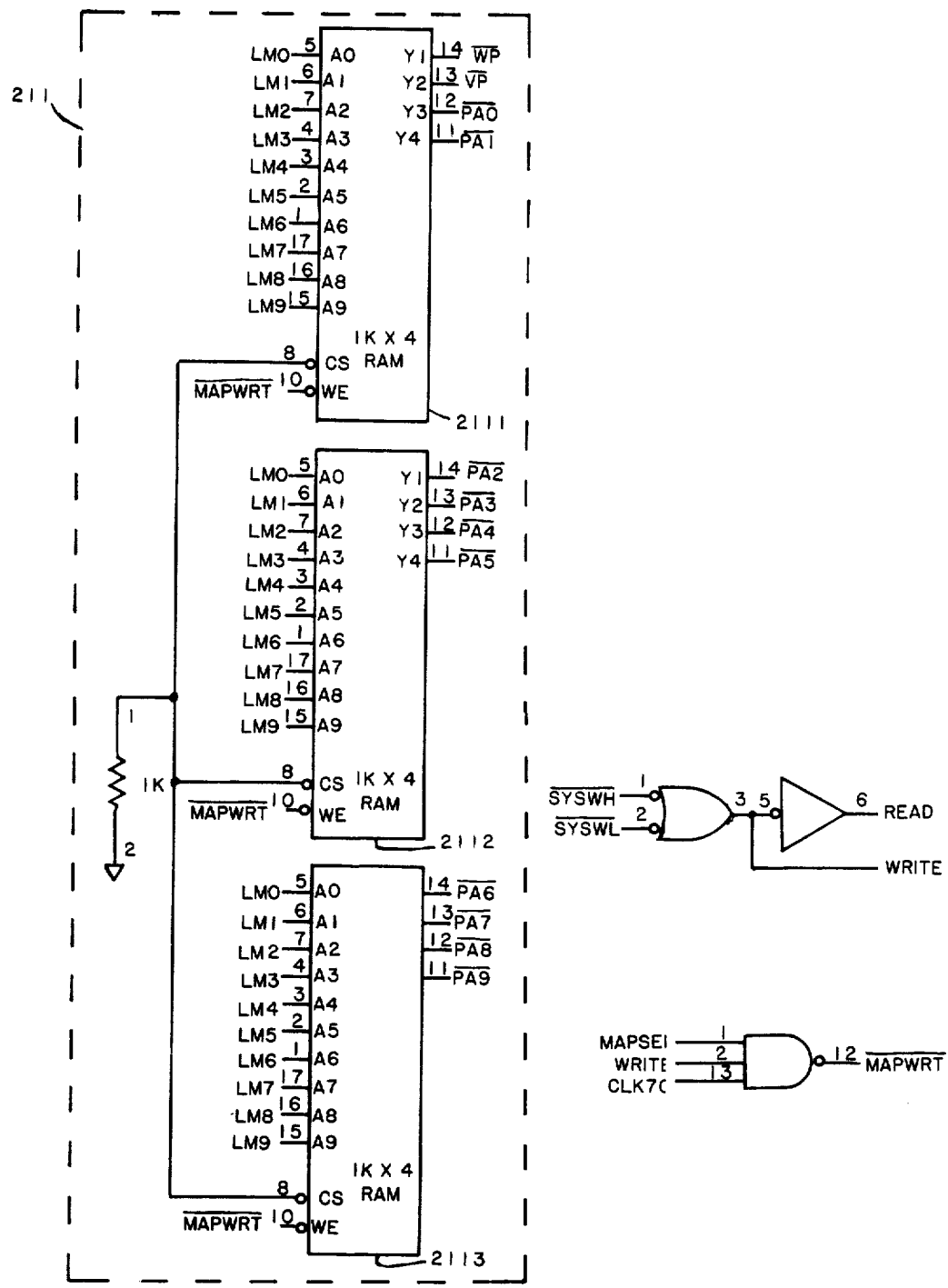

FIGS. 6 and 6A

FIGS. 6 and 6A show logic circuitry for implementing multiplexer 210 and map 211. Map 211 (FIG. 6A) employs three 1K×4 bit RAM's 2111-2113 to form a 1K×12 bit memory which provides mapping for both HP 101 and AP 106. Each of the 1024 addresses available from map 211 specifies the physical location of 1K words, giving the system a total physical address space of 1024K words. In this embodiment, HP 101 use 256×12 bits of the array to provide four user maps and four data channel maps. AP 106 mapping uses 512×12 bits to accommodate its 512K words of logical address space. All map loading, including the AP 106 map area, is loaded by HP 101. As discussed below in regard to FIG. 7, the contents of map 211 can be modified under the control of HP 101.

In response to map address bits LM0-LM9, RAM's 2111-2113 provide memory address bits $\overline{\text{PA0-PA9}}$, $\overline{\text{WP}}$, which indicates if the memory location corresponding to the address is write protected, and $\overline{\text{VP}}$, which indicates if the memory location is validity protected. LM0-LM9 are supplied from multiplexer 210, which is constructed of 2-line multiplexers 2101 and 2102 and 4-to-1 multiplexers 2103 and 2104. Quad flip-flop 601 is clocked by the rising edge of the output of gate 602, which will occur when either ALPHAP1MOS or $\overline{\text{LMSSEL}}$, from PAL 2121, goes high after both have been low simultaneously. Flip-flop 601 receives $\overline{\text{BMB0}}$, $\overline{\text{BMB11}}$, $\overline{\text{BMB13}}$ and $\overline{\text{BMB15}}$ as inputs and provides $\overline{\text{WPEN}}$ (write protect enable), UMAP1 and UMAP2 (user map selection bits) and SLEAZE (parity indication). UMAP1 and UMAP2 are individually ANDed with $\overline{\text{ABGRNT}}$ from bus arbitration logic 1180 to yield MAPA and MAPB, which are provided to multiplexer 2104. Selection among the inputs to multiplexers 2103 and 2104 is based on the state of signals MAPEN and SMB. If MAPS is high, SMB will be high. If MAPS is low, SMB will have the same state as $\overline{8086}$. Table 1 shows the results of the selection done by multiplexers 2101-2103 in response to the four possible combinations of input conditions.

TABLE 1

| | | | | |
|---|---|---|---|---|
| MAPS | 0 | 0 | 0 | 1 |
| MAPEN | 0 | 1 | 1 | 0 |
| SMB | 0 | 0 | 1 | 1 |
| LM0 | 0 | 0 | 1 | LA6 |
| LM1 | 1 | 0 | XLA0 | LA7 |
| LM2 | 0 | ABGRNT | XLA1 | LA8 |
| LM3 | HYPER | MAPB | XLA2 | LA9 |
| LM4 | 0 | MAPA | XLA3 | LA10 |
| LM5 | LA1 | LA1 | LA1 | LA11 |
| LM6 | LA2 | LA2 | LA2 | LA12 |
| LM7 | LA3 | LA3 | LA3 | LA13 |
| LM8 | LA4 | LA4 | LA4 | LA14 |
| LM9 | LA5 | LA5 | LA5 | LA15 |

If $\overline{\text{MAPS}}$ (map select) from hyperspace PAL 2121 is asserted low, MAPSEL (map read/write) will be high when data is enabled and low otherwise.

$\overline{\text{MAPWRT}}$ (map write) will go low at the rising edge of CLK70, if MAPSEL is high and a write operation is underway, indicated by $\overline{\text{SYSWL}}$ or $\overline{\text{SYSWH}}$ being low. When $\overline{\text{MAPWRT}}$ goes low the data PA0–PA9 from transceiver 215, discussed below, along with $\overline{\text{WP}}$ and $\overline{\text{VP}}$ will be stored at the address on LM0–LM9. Since MAPS is high and MAPEN is low, this address will be specified by the data on LA6–LA15 and is under the control of HP 101 only. If MAPSEL is high, but a read operation is requested, the direction of transceiver 215 is reversed $\overline{\text{WP}}$, $\overline{\text{VP}}$ and $\overline{\text{PA0–PA9}}$ will be provided to $\overline{\text{BMB0–BMB15}}$.

The 512×12 bit area devoted to AP 106 mapping will be entered when 8086 (and therefore LM0) is high. As mentioned above, MAPEN is held high when 8086 is high. AP 106 provides nine bits of information, LA1–LA5 and XLA0–XLA3, to RAM's 2111-2113. When CPU 201 has enabled map 211 and, therefore, 8086 is low, MAPEN will be high and SMB will be low. In this condition, ABGRNT, MAPA and MAPB allow selection among the eight HP 101 maps. Addresses for the 1K blocks of memory within the 32×12 bit areas of each map are specified by LA1–LA5. The 256×12 bit area accessed when MAPEN and SMB are both low provides maping for all CPU 201 memory accesses other than the eight HP 101 maps, such as accesses to memory areas which support hyperspace operations and accesses for identity purposes.

FIG. 7

Figures 1, 7:
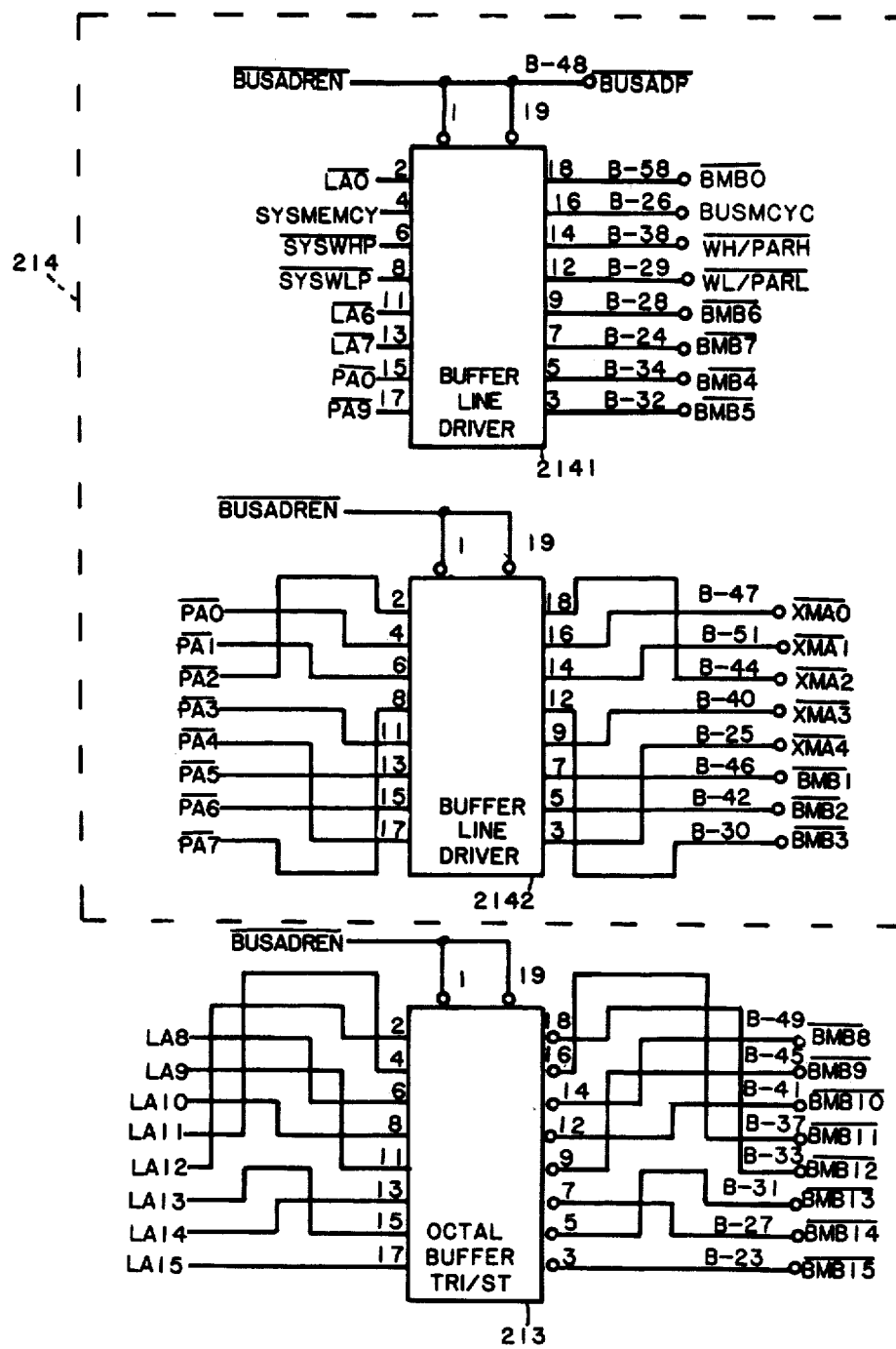
FIGS. 7 and 7A show specific logic circuitry for implementing three-state buffer 213, buffer line drivers 214, transceiver 215 and I/O device decode logic 212.
Figures 2, 7:
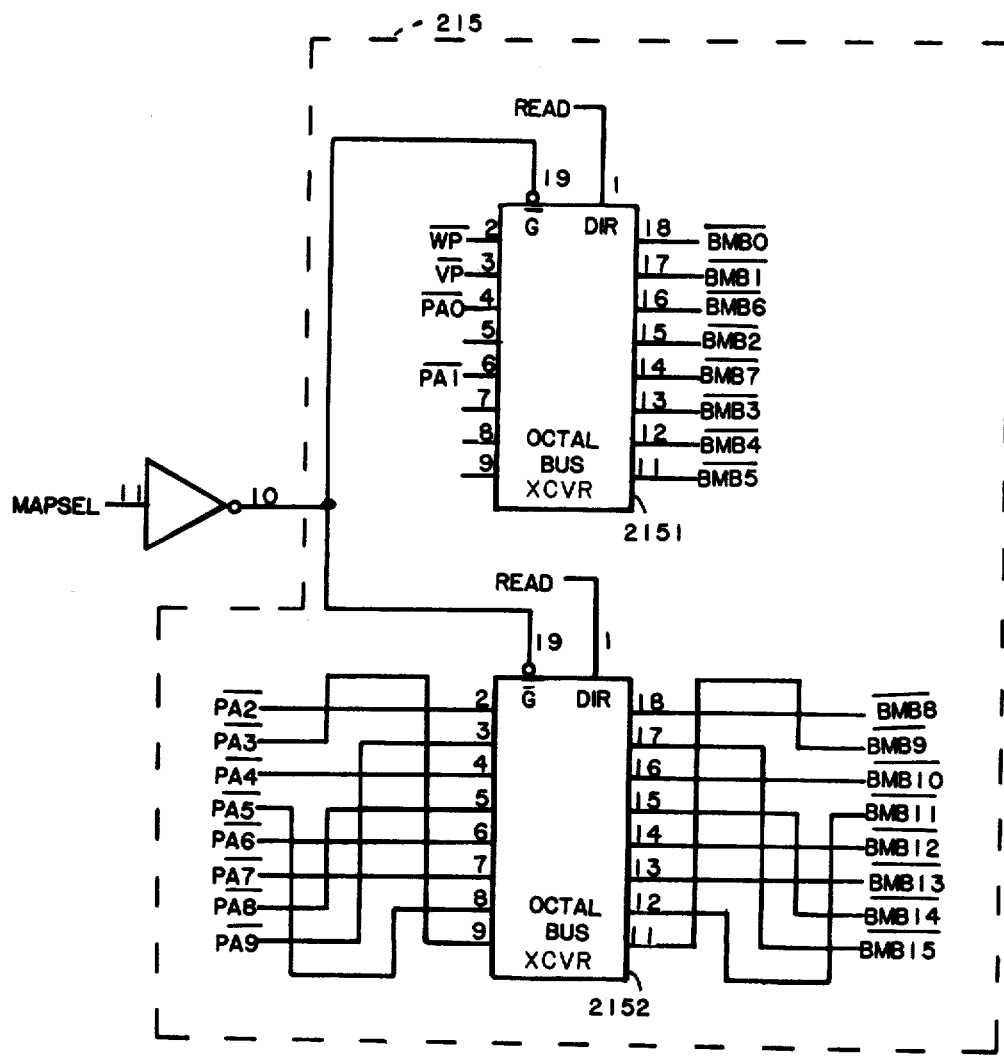
Figure 7A:
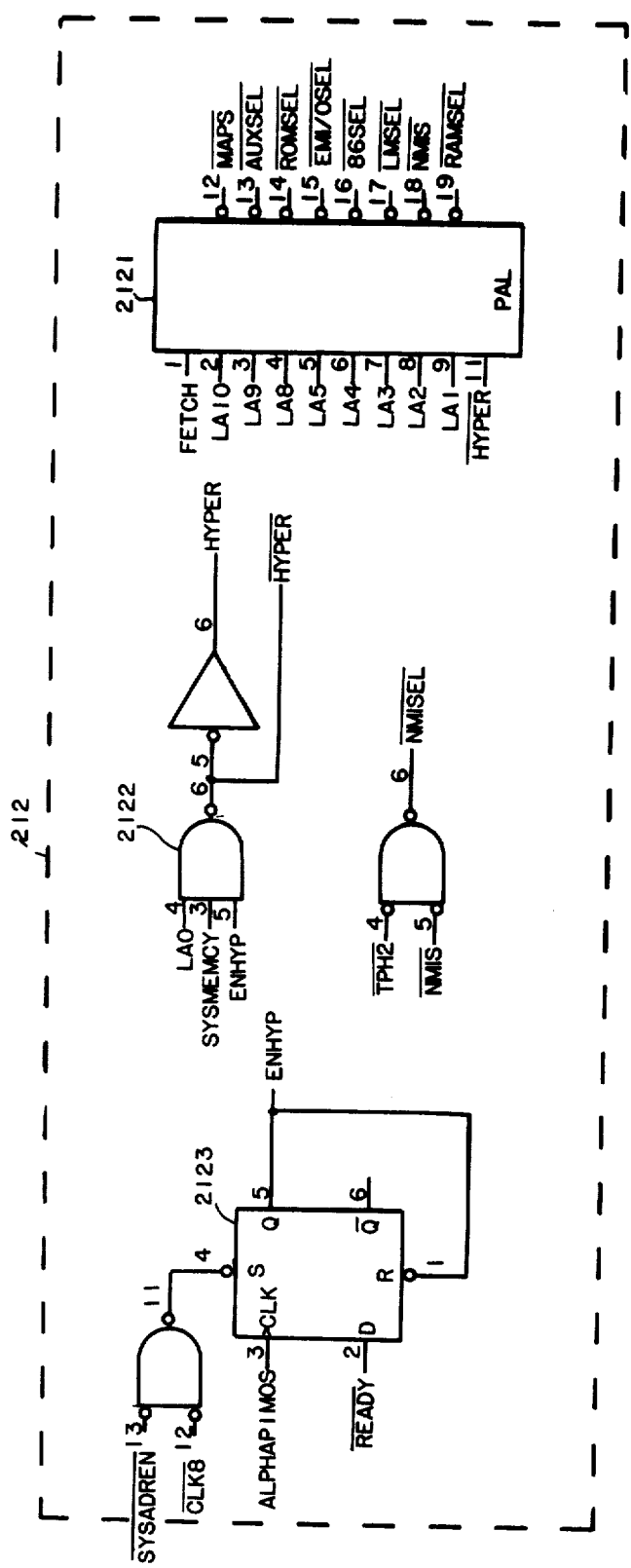
Figure 8:
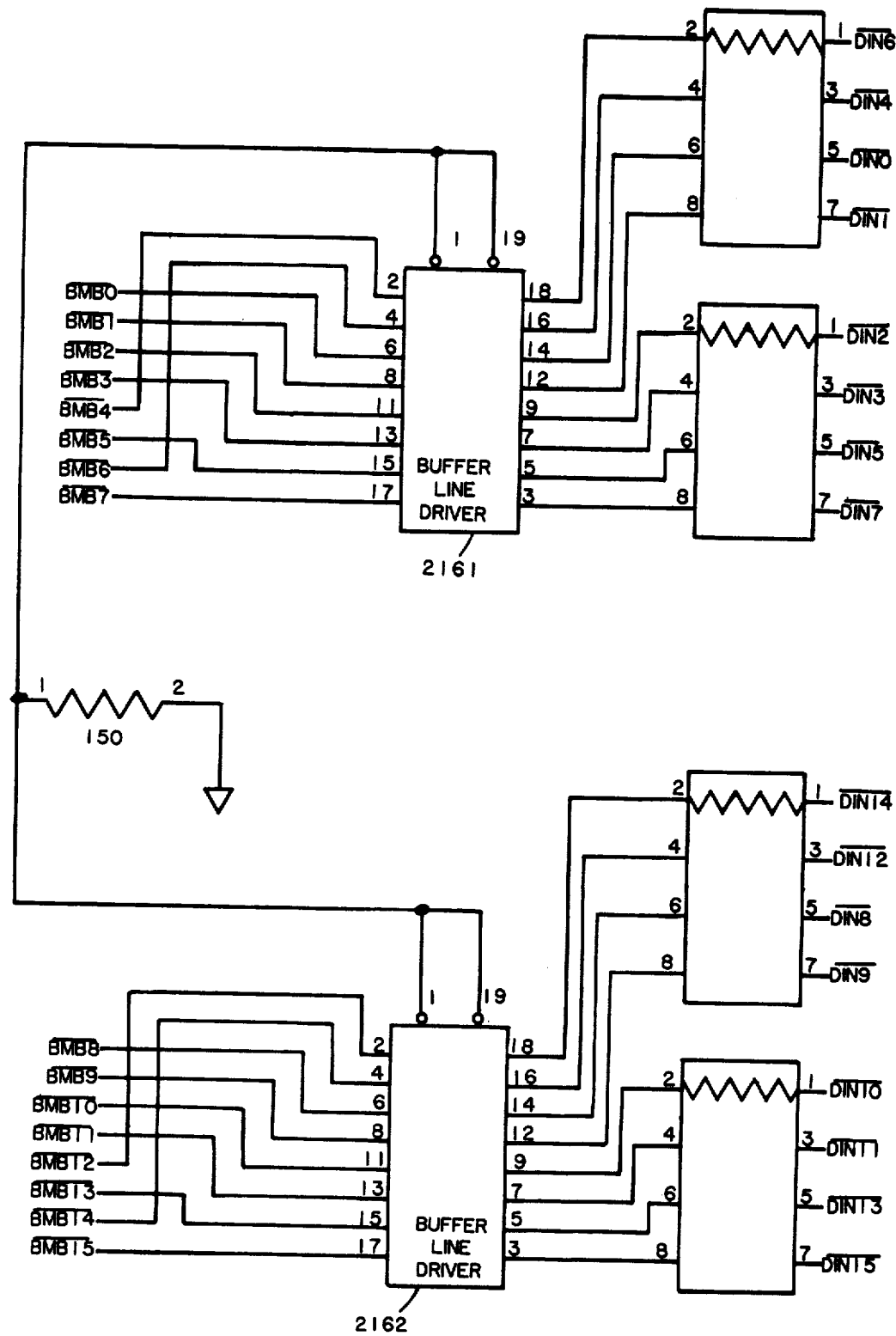
FIG. 8 shows specific logic circuitry for implementing buffer line drivers 216.

FIG. 7 shows logic circuitry for implementing three-state buffer 213, buffer line driver 214 and transceiver 215. Looking first at transceiver 215, implemented as octal transceivers 2151 and 2152, one side of transceivers 2151 and 2152 is connected to $\overline{\text{WP}}$, $\overline{\text{VP}}$, and $\overline{\text{PA0–PA9}}$. The other sides are connected to $\overline{\text{BMB0–BMB15}}$. The direction of data flow is controlled by READ such that, if MAPSEL is high, and therefore MAPS is high, and READ is low, the data on $\overline{\text{BMB0}}$, $\overline{\text{BMB1}}$ and $\overline{\text{BMB6–BMB15}}$ will be presented to RAM's 2111-2113 for storage at the address LA6–LA15, as specified above in Table 1. If MAPSEL is high and READ is high, $\overline{\text{PA0–PA9}}$, $\overline{\text{VP}}$, $\overline{\text{WP}}$ from map 211 at address LA6–LA15 are presented on $\overline{\text{BMB0}}$, $\overline{\text{BMB1}}$ and $\overline{\text{BMB6–BMB15}}$.

$\overline{\text{PA0–PA9}}$ are also supplied to buffer line drivers 2141 and 2142, along with SYSMEMCY; $\overline{\text{SYSWHP}}$, low when indicating that a high byte write has been requested to a memory area which is not write protected; $\overline{\text{SYSWLP}}$, low when indicating that a low byte write has been requested to a memory area which is not write protected and the inverse of LA0, LA6 and LA7. The address information is placed onto $\overline{\text{BMB0–BMB7}}$ wherever $\overline{\text{BUSADREN}}$ is low. Buffer line driver 2142 also provides five extended memory address bits $\overline{\text{XMA0–XMA4}}$ based on $\overline{\text{PA0–PA4}}$. XMA0–XMA4 are used in addressing expanded memory (not shown) in addition to RAM 218. LA8–LA15 are supplied to three-state buffer 213 and, if $\overline{\text{BUSADREN}}$ is low, placed onto $\overline{\text{BMB8–BMB15}}$. Since $\overline{\text{BUSADREN}}$ is never low when MAPSEL is high, there is no conflict on $\overline{\text{BMB0–BMB15}}$.

FIG. 7A

Looking now at I/O device decode Logic 212, hyperspace PAL 2121 receives LA1–LA5, LA8–LA10, FETCH and $\overline{\text{HYPER}}$ as inputs. Based on these inputs PAL 2121 outputs $\overline{\text{MAPS}}$ (map select), $\overline{\text{AUXSEL}}$ (auxiliary I/O select), $\overline{\text{ROMSEL}}$ (hyperspace ROM 108 select), $\overline{\text{EMI/OSEL}}$ (emulated I/O selected), 86SEL (AP 106 select), $\overline{\text{LMSSEL}}$ (load map status select), $\overline{\text{NMIS}}$ (NMI select) and $\overline{\text{RAMSEL}}$ (RAM 218 select). FETCH, as mentioned, indicates that the memory operation in progress is an instruction fetch. $\overline{\text{HYPER}}$, from gate 2122, is low only when LA0 and SYSMEMCY are both high (indicating an I/O operation) and ENHYP (hyperspace PAL enable) from flip flop 2123 is also high. ENHYP will be driven high at the falling edge of CLK8 during each PH1 period in which $\overline{\text{SYSADREN}}$ is asserted low. When $\overline{\text{SYSADREN}}$ goes high, at approximately the end of PH1, the set pulse to flip flop 2123 is removed. ENHYP will stay high until driven low by READY low at the rising edge of ALPHAP1MOS. ENHYP will therefore stay high wherever a current memory or I/O transaction cannot be completed and will go low when the transaction is done.

Only one of the outputs of hyperspace PAL 2121 will be high at any one time. Therefore, whenever an I/O operation is underway and PAL 2121 is enabled, address bits LA1–LA5 and LA8–LA10 are decoded by PAL 2121 to uniquely identify the type of I/O operation being requested. Table 2 shows the logic statements for correlating the outputs of PAL 2121 with the inputs. An asterisk indicates a logical AND operation while a pulse sign indicates a logical OR operation.

TABLE 2

| | | | | | | | | | | | | | | | |
|---|---|---|---|---|---|---|---|---|---|---|---|---|---|---|---|
| ROMSEL | = | HYPER | * | LA1 | * | LA2 | | | | | | | | | |
| RAMSEL | = | HYPER | * | $\overline{\text{LA1}}$ | | | | | | | | | | | |
| | | +HYPER | * | LA1 | * | $\overline{\text{LA2}}$ | * | $\overline{\text{LA3}}$ | | | | | | | |
| | | +HYPER | * | LA1 | * | $\overline{\text{LA2}}$ | * | LA3 | * | $\overline{\text{LA4}}$ | | | | | |
| MAPS | = | HYPER | * | LA1 | * | $\overline{\text{LA2}}$ | * | LA3 | * | LA4 | * | LA5 | | | |
| EMIOSEL | = | HYPER | * | LA1 | * | $\overline{\text{LA2}}$ | * | LA3 | * | LA4 | * | $\overline{\text{LA5}}$ | * | $\overline{\text{FETCH}}$ | |
| | | | * | LA8 | * | LA9 | * | LA10 | | | | | | | |
| | | +HYPER | * | LA1 | * | $\overline{\text{LA2}}$ | * | LA3 | | | * | $\overline{\text{LA5}}$ | * | $\overline{\text{FETCH}}$ | |
| | | | * | LA8 | * | LA9 | * | $\overline{\text{LA10}}$ | | | | | | | |
| | | +HYPER | * | LA1 | * | $\overline{\text{LA2}}$ | * | LA3 | | LA4 | * | $\overline{\text{LA5}}$ | * | $\overline{\text{FETCH}}$ | |
| | | | * | LA8 | * | $\overline{\text{LA9}}$ | * | LA10 | | | | | | | |
| | | +HYPER | * | LA1 | * | $\overline{\text{LA2}}$ | * | LA3 | * | LA4 | | $\overline{\text{LA5}}$ | | $\overline{\text{FETCH}}$ | |
| | | | * | $\overline{\text{LA8}}$ | * | LA9 | * | LA10 | | | | | | | |
| AT6SEL | = | HYPER | * | LA1 | * | $\overline{\text{LA2}}$ | * | $\overline{\text{LA3}}$ | * | LA4 | * | $\overline{\text{LA5}}$ | * | $\overline{\text{FETCH}}$ | |
| | | | * | $\overline{\text{LA8}}$ | * | LA9 | * | $\overline{\text{LA10}}$ | | | | | | | |
| LMSSEL | = | HYPER | * | LA1 | * | $\overline{\text{LA2}}$ | * | LA3 | * | LA4 | * | $\overline{\text{LA5}}$ | * | $\overline{\text{FETCH}}$ | |
| | | | * | $\overline{\text{LA8}}$ | * | $\overline{\text{LA9}}$ | * | LA10 | | | | | | | |

TABLE 2-continued

| NMIS | = | HYPER | • | LA1 | • | $\overline{LA2}$ | • | LA3 | • | LA4 | • | $\overline{LA5}$ | | |
| | | | • | $\overline{LA8}$ | • | LA9 | • | $\overline{LA10}$ | | | | | | |
| AUXSEL | = | HYPER | • | LA1 | • | $\overline{LA2}$ | • | LA3 | • | LA4 | • | $\overline{LA5}$ | • | $\overline{FETCH}$ |
| | | | • | LA8 | • | $\overline{LA9}$ | • | $\overline{LA10}$ | | | | | | |

As stated above, HP 101 controls all system I/O, therefore AP 106 does not need to communicate with PA 2121. Since LA0 is held low whenever AP 106 is running, keeping $\overline{HYPER}$ high, AP 106 is prevented from accessing hyperspace ROM 108.

FIG. 8

Logic circuitry for implementing buffer line driver 216 is also shown in FIG. 7. $\overline{BMB0}$–$\overline{BMB7}$ are supplied to driver 2161 and $\overline{BMB8}$–$\overline{BMB15}$ are supplied to driver 2162. The outputs of drivers 2161 and 2162 are supplied to RAM 218 as data inputs $\overline{DIN0}$–$\overline{DIN15}$.

FIG. 9

Figures 1, 9:
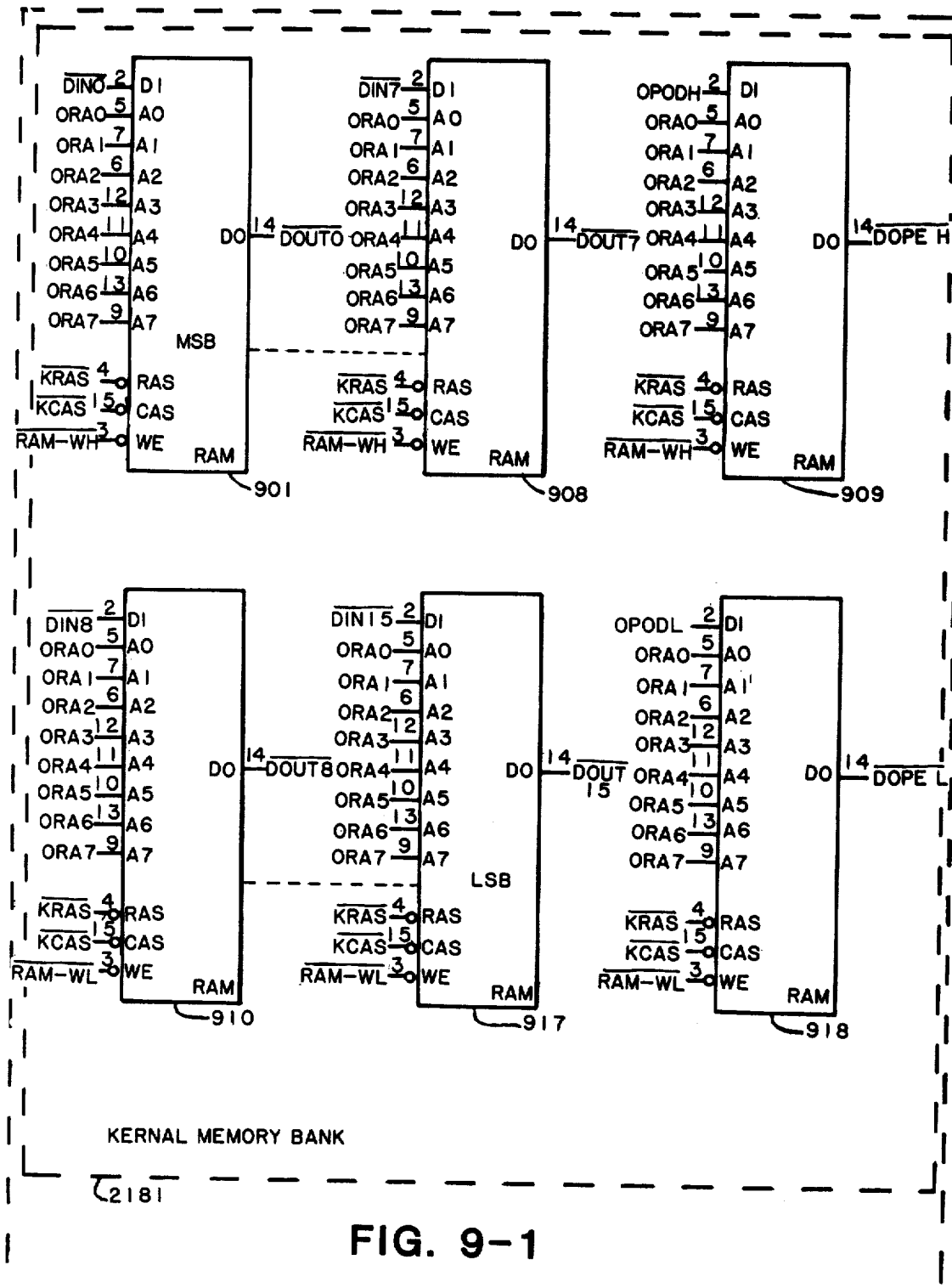
FIGS. 9-9E show specific logic circuitry for implementing memory addressing 217, RAM 218 and latch 219.
Figures 2, 9:
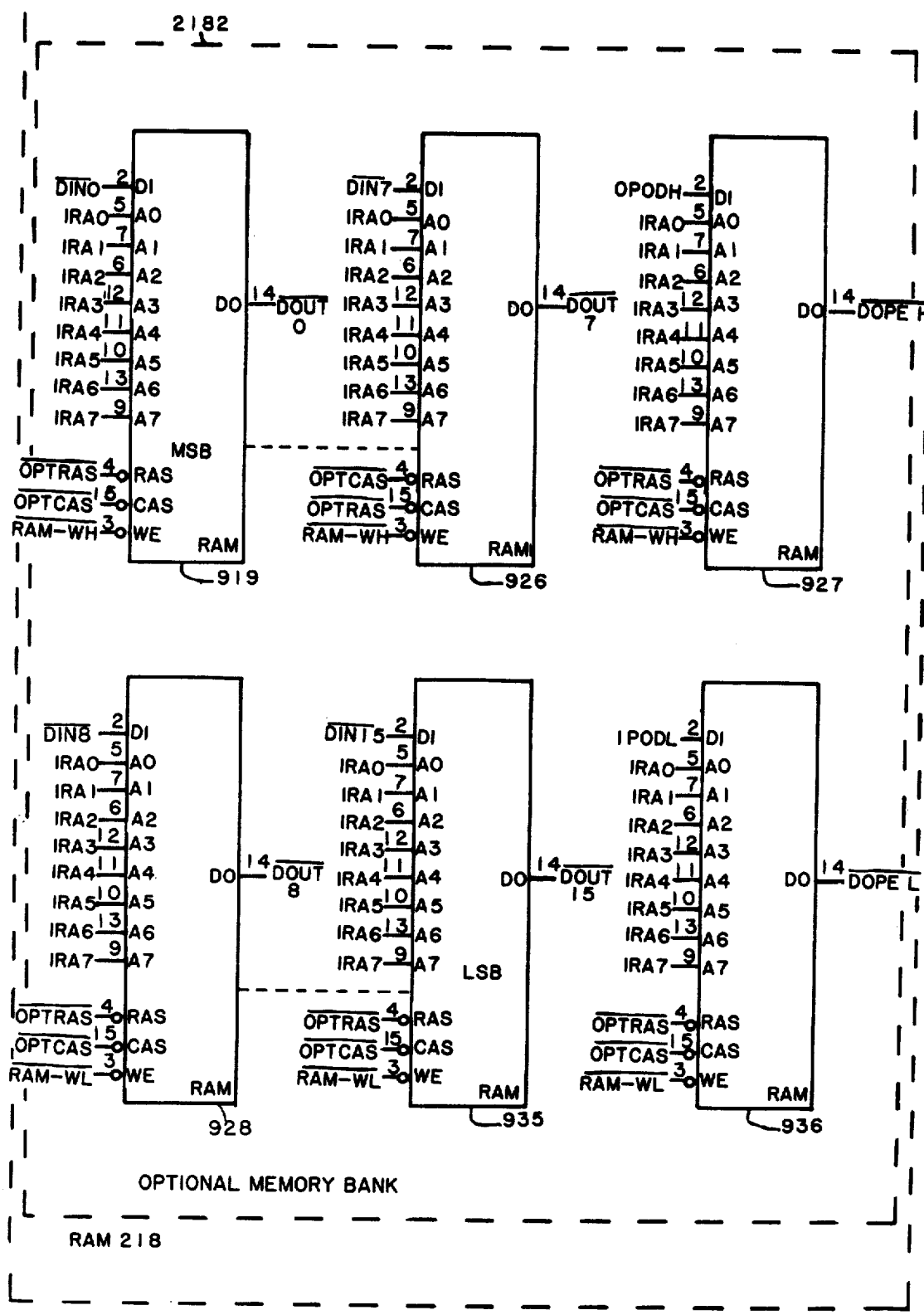
Figure 9A:
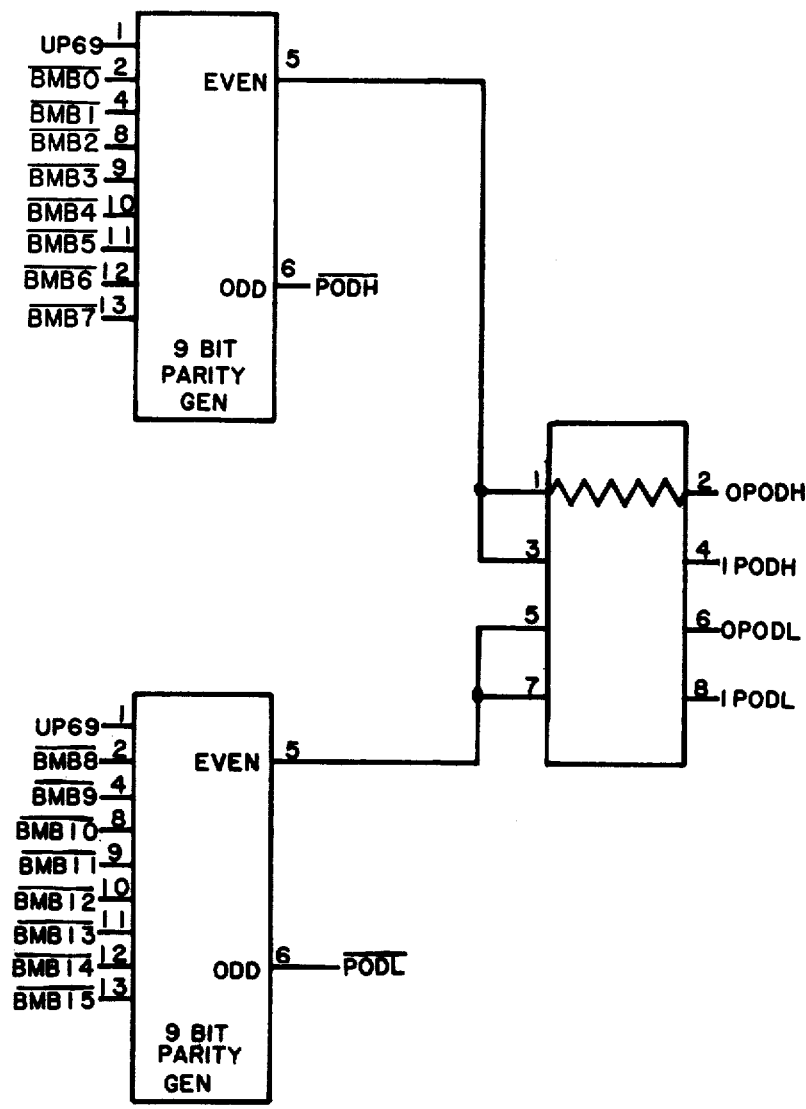

Circuitry for implementing RAM 218 is shown in FIG. 9. In this embodiment, RAM 218 is constructed of thirty-six 64K×1 bit RAM's 901–936. RAM's 901–936 are considered as being divided into a "kernal" memory bank 2181 made up of RAMS 901—918 and an "optional" memory bank 2182 made up of RAMS 919–936. The kernal and optional memories are further divided into a high memory byte of 8 RAM's (901–908 and 919–926) and a low memory byte of eight RAM's (910–917 and 928–935). Each byte has a ninth parity RAM associated with it (909, 918, 927, 936). This arrangement yields a system memory of 128K 16-bit words, each word having an upper byte and lower byte parity bit associated with it. It will be appreciated by those knowledgeable in the art that well-known techniques are available to modify the system to use memories of different storage capacity.

As shown in FIG. 9, each RAM 901–918 is supplied with eight bits of address data 0RA0–0RA7, $\overline{KRAS}$ (kernal row address strobe) and $\overline{KCAS}$ (kernal column address strobe). The high memory byte receives $\overline{RAM\text{-}WH}$ (high byte write) and the low memory byte receives $\overline{RAM\text{-}WL}$ (low byte write). Parity RAM's 909 and 918 receive parity data bits 0PODH and 0PODL respectively at their data inputs while RAM's 901–908 and 910–917 each receive one of the data bits $\overline{DIN}$ $\overline{0\text{-}DIN15}$ at their data inputs. Finally, each RAM 901–908, 910–917 supplies one bit of the output $\overline{DOUT}$ $\overline{0\text{-}DOUT15}$ while RAM 909 and 918 supply output parity bits $\overline{DOPE\ H}$ and $\overline{DOPE\ L}$. RAMS 919–936 are addressed in the same manner, except that they receive address bits 1RA0–1RA8, optional memory row strobe $\overline{OPTRAS}$, optional memory column strobe $\overline{OPTCAS}$ and parity inputs 1PODH and 1PODL.

FIG. 9A

Parity data 0PODH, 1PODH, 0PODL and 1PODL are supplied to RAM 218 from 9-bit parity generators 930 and 931. Parity generators 930 and 931 receive BMB0–BMB15 and, in this embodiment, have their even parity outputs supplied to RAM 218. In this figure, and in the other figures herein, a signal identified as "UP" or "PUP" is a "pull-up" input and is always high.

FIG. 9B

Logic circuitry for implementing memory addressing and control 217 is shown in FIGS. 9B, 9C, 9D and 9E.

Figures 1, 9B:
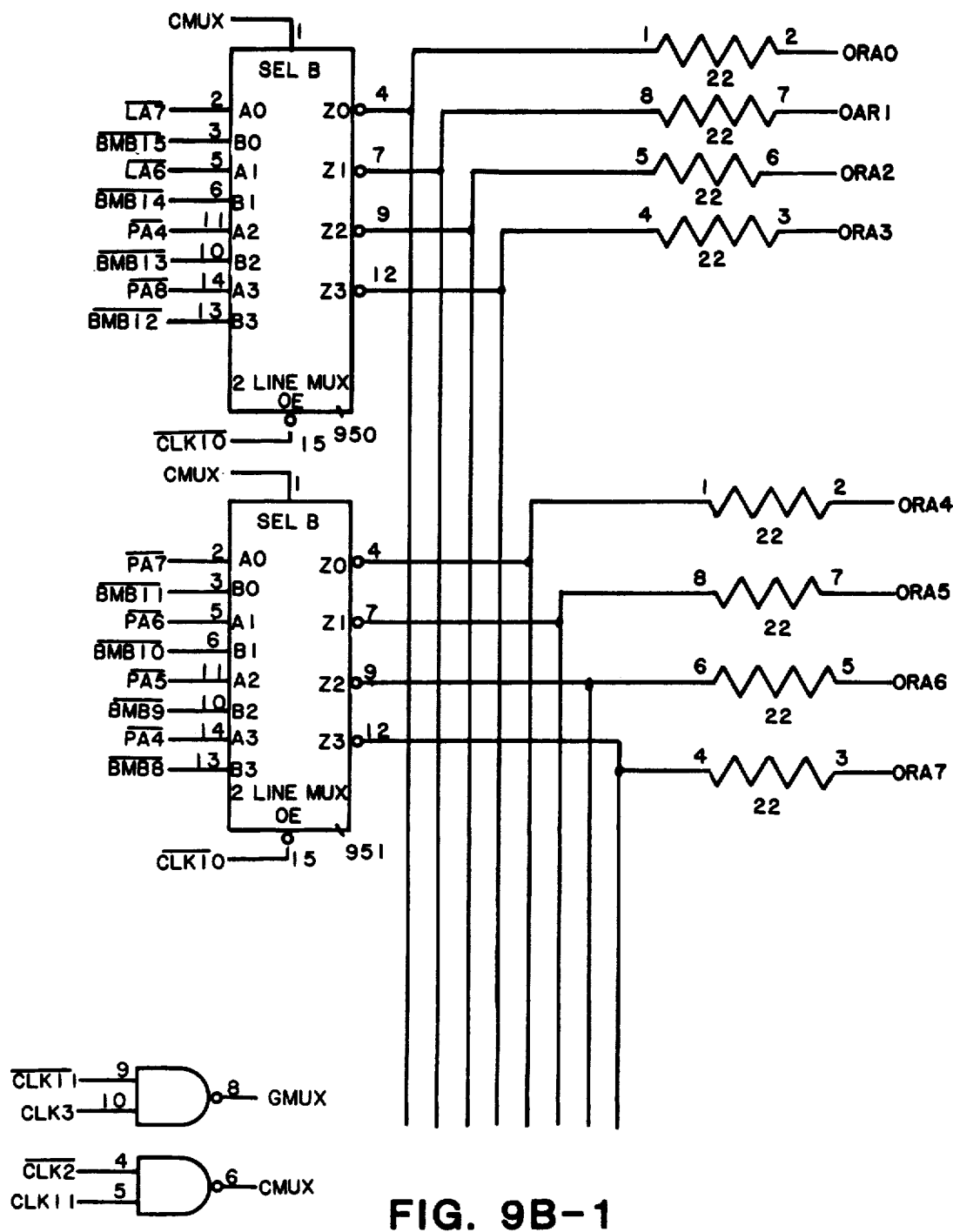

Looking first at FIG. 9B, row address and column address multiplexing circuitry as shown. As mentioned above, video logic 104 in the system described herein incorporates a CRT controller. This controller, the techniques for implementation which are well understood in the art, is allowed to access RAM 218 during PH1, when memory accesses by other system components are prohibited, to retrieve data for display.

Address multiplexing 217 therefore incorporates five multiplexers 950–954. Multiplexers 950 and 951 involve addressing of RAM 218 by HP 101 or AP 106 while multiplexers 952–954 involve addressing of display related information being accessed by the CRT controller. CMUX, the selection input to multiplexers 950 and 951, and GMUX, the selection input to multiplexers 952 and 953, are timing signals to allow the source of the multiplexer outputs to change from the row address to the column address at the proper time. GMUX goes low when CLK3 goes high and returns high when $\overline{CLK11}$ goes low. CMUX goes low when $\overline{CLK2}$ goes high and returns high when CLK11 goes low. GRACYC, the selection input to multiplexer 954, is generated by video logic 104. Contention on the multiplexer output lines is avoided by enabling 950 and 951 when $\overline{CLK10}$ is low and 952–954 when CLK10 is low.

FIG. 9C

Figures 2, 9B, 9C:
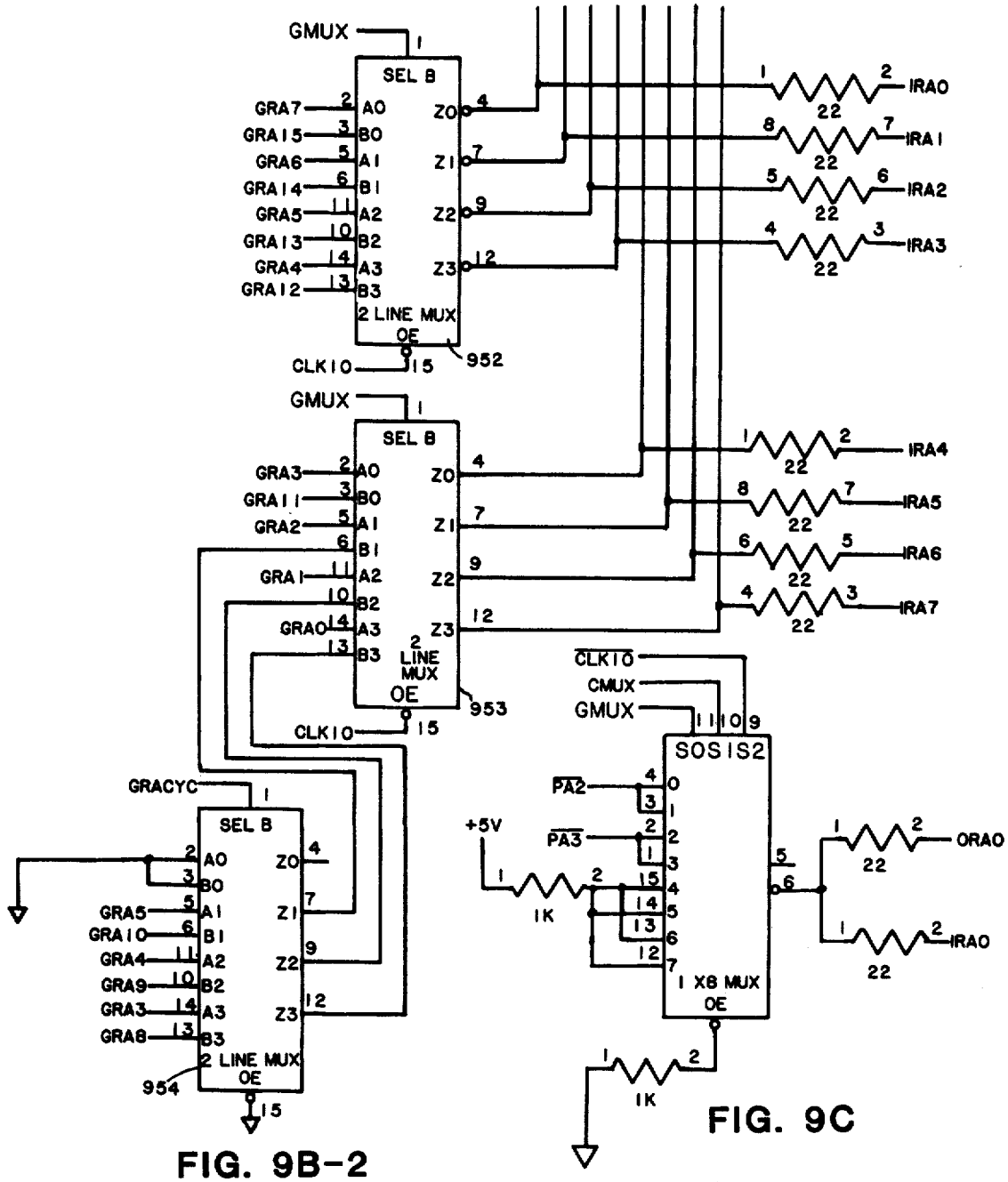

Addressing for a RAM 218 incorporating 256K×1 bit RAM's (schematically identical to RAM's 901–936 of FIG. 9 except having nine address inputs 0RA0-0-RA8 and 1RA0–1RA8) can be accomplished in a straightforward manner and without modification of the circuitry of FIG. 9B by use of the circuitry of FIG. 9C to utilize $\overline{PA2}$ and $\overline{PA3}$ to generate 0RA8 and 1RA8.

FIG. 9D

Figure 9D:
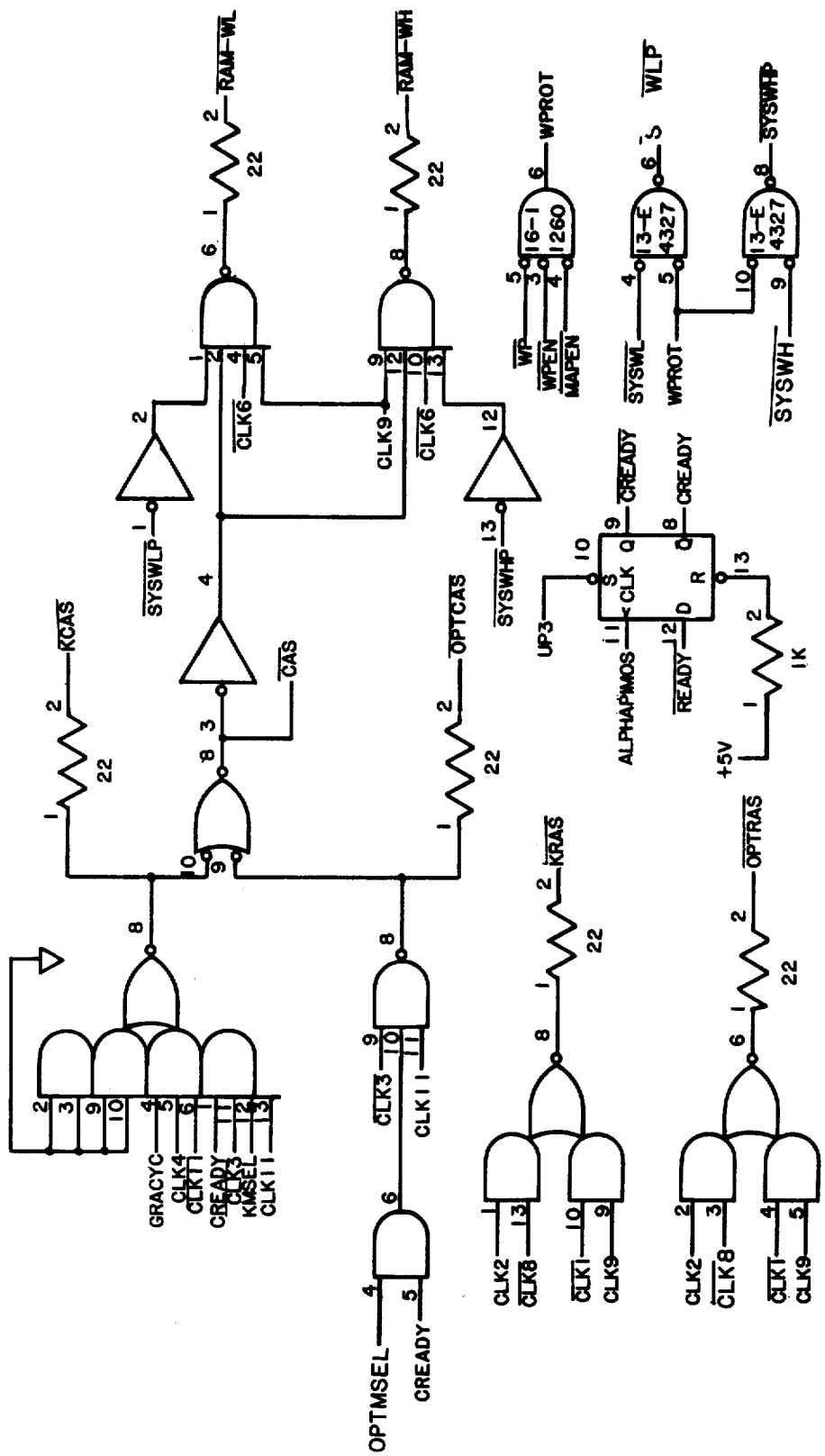

Logic for generating the row and column address strobes for the kernal and optional memory banks and the high and low byte write signals is shown in FIG. 9D. It can be seen that there will be a row strobe and a column strobe generated during PH1, for use by the CRT controller in accessing data for display, and a row and column strobe generated durinhg PH2 for use by HP101 or AP106 in writing to or reading from RAM 218. Since the CRT controller does not write data to RAM 218, the write enable signals will occur only during PH2.

$\overline{KRAS}$ and $\overline{OPTRAS}$ are low when CLK2 is high and CLK8 is high or when $\overline{CLK1}$ is high and CLK9 is high. These CLK signals, as well as the other timing signals discussed below, are depicted in FIG. 10A. $\overline{KCAS}$ is asserted low when (a) GRACYC is high (indicating the CRT controller is generating the column address to memory), CLK4 is high and $\overline{CLK11}$ is high or (b) when CLK11 is high, CREADY is high, (indicating READY is high when ALPHAP1MOS goes high at the end of PH2), $\overline{CLK3}$ is high and KMSEL (kernal memory select) is high. $\overline{OPTCAS}$ is asserted low when CLK11 is high, CREADY is high, $\overline{CLK3}$ is high and OPTMSEL (optional memory select) is high. Generation of KMSEL and OPTMSEL (FIG. 9E) is discussed below. $\overline{\text{RAM-WL}}$ will go low if either $\overline{\text{KCAS}}$ or $\overline{\text{OPTCAS}}$ is asserted low, CLK9 is high, CLK6 is high and $\overline{\text{SYSWLP}}$, indicating that a low byte write has been requested to a memory area which is not write protected, is low. Similarly, $\overline{\text{RAM-WH}}$ will go low if $\overline{\text{KCAS}}$ or $\overline{\text{OPTCAS}}$ is low, CLK 9 is high, $\overline{\text{CLK6}}$ is high and $\overline{\text{SYSWHP}}$, indicating that a high byte write has been requested to a memory area which is not protected, is low.

Figures 1, 9E:
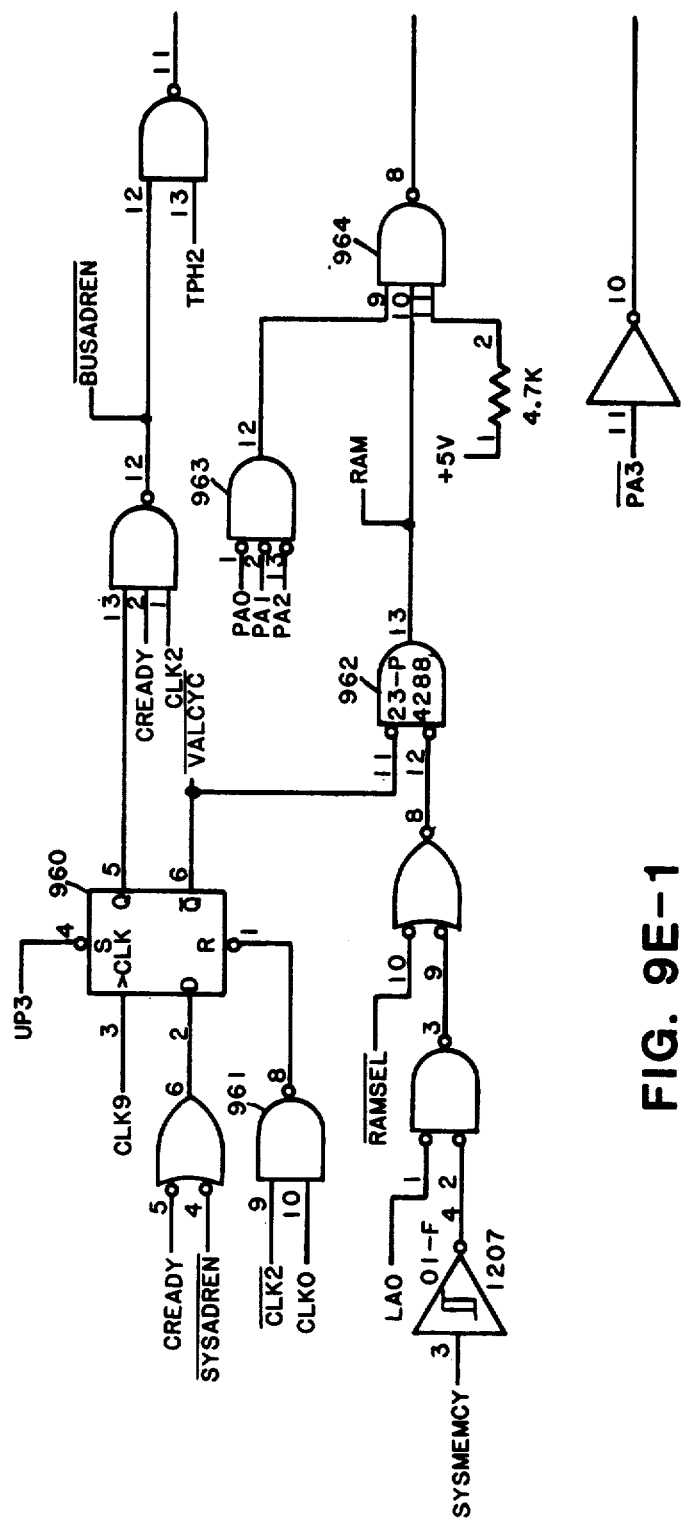
Figures 2, 9E:
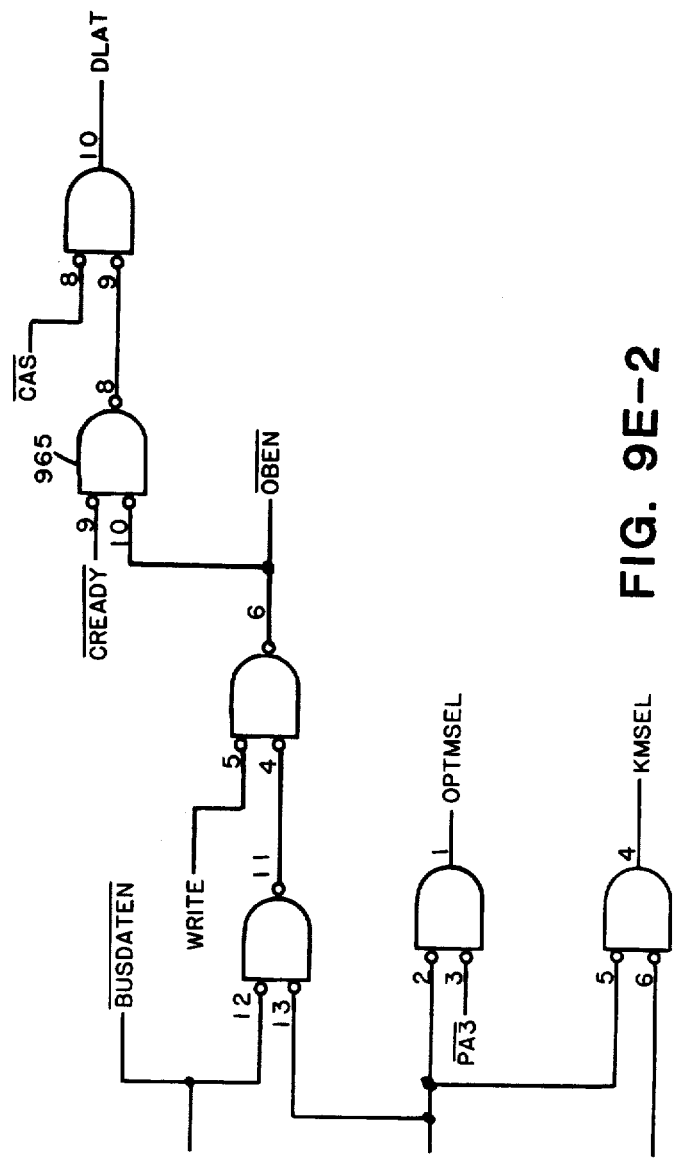
Figure 9F:
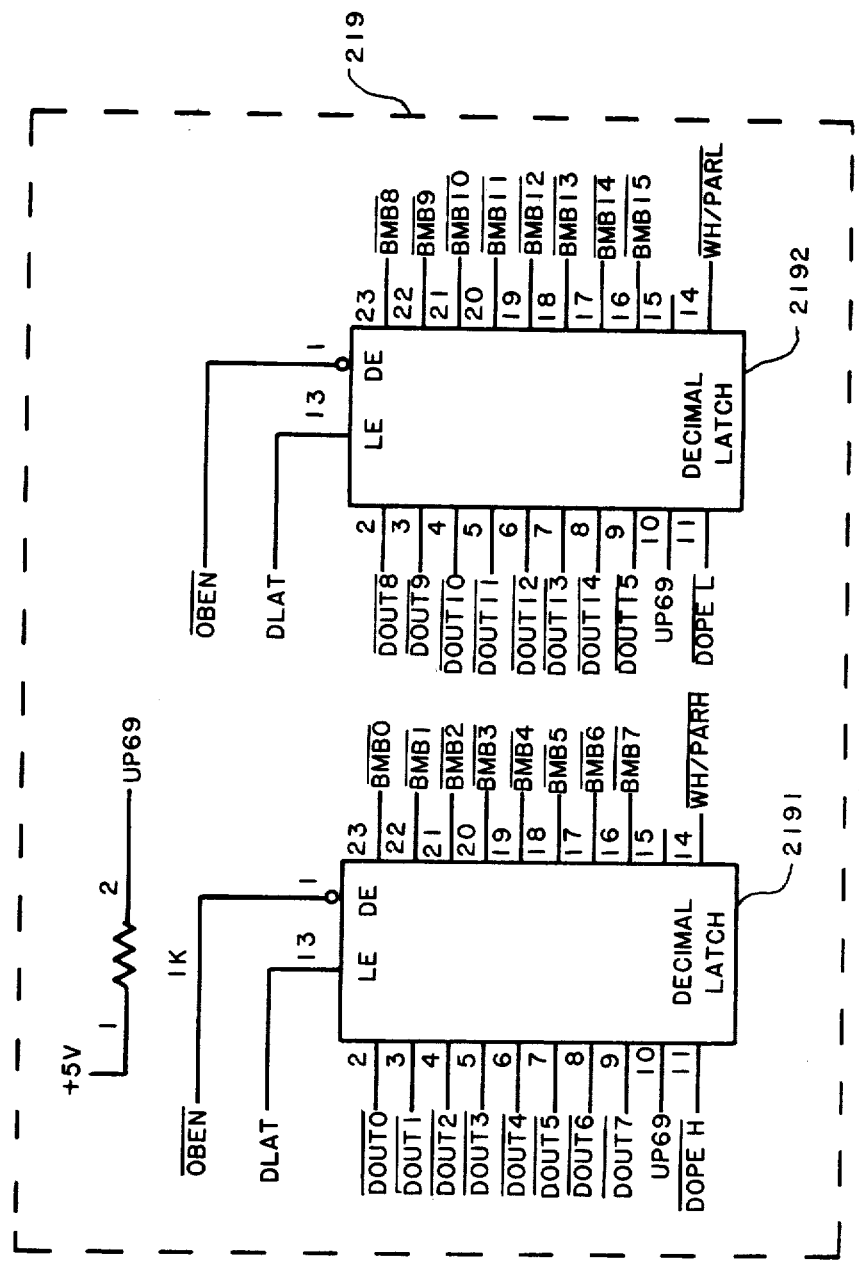

FIGS. 9E and 9F

Logic circuitry for generating KMSEL, OPTMSEL, DLAT (data latching signal to latch 219) and $\overline{\text{OBEN}}$ (output enabling signal to latch 219) is shown in FIG. 9E. Looking first at flip flop 960, when CLK0 goes high, $\overline{\text{VALCYC}}$ (valid cycle) will be driven high by the output of gate 961. When $\overline{\text{CLK2}}$ subsequently goes low, the output of gate 961 will return high and the reset signal is removed. If either CREADY is low or $\overline{\text{SYSA}}$ $\overline{\text{DREN}}$ is low, $\overline{\text{VALCYC}}$ will be driven low at the following CLK9 rising edge. $\overline{\text{VALCYC}}$ must be low to allow selection of either kernal or option memory. If $\overline{\text{VALCYC}}$ is low and either $\overline{\text{RAMSEL}}$, from hyperspace PAL 2121, is low or SYSMEMCY is high and LA0 is low, indicating a memory operation, the output of gate 962 will go high. Gate 963 receives PA0–PA2, which provide the capability for expanding the system to accommodate selectable memory areas in addition to the kernal and optional memory banks. In the particular embodiment described herein, either kernal or optional memory will always be selected, therefore PA0–PA2 are held low and the output of gate 963 is held high. When the output of gate 962 goes high, either the kernal or optional memory will be selected, depending on the state of $\overline{\text{PA3}}$.

Returning to flip flop 960, when $\overline{\text{VALCYC}}$ goes low, the Q output of flip flop 960 will go high. If CREADY and CLK2 are high, $\overline{\text{BUSADREN}}$ will go low. $\overline{\text{BUSA}}$ $\overline{\text{DREN}}$ is used to enable three-state buffer 213 and buffer line drivers 2141 and 2142 (FIG. 7). When CLK2 goes low, $\overline{\text{BUSADREN}}$ will go high, and since PH2 is high at this time, $\overline{\text{BUSDATEN}}$ will go low. If the output of gate 964 and WRITE go low (indicating a memory write operation is not requested) while BUSDATEN is low, $\overline{\text{OBEN}}$ will go low enabling the outputs of latch 219. If $\overline{\text{OBEN}}$ is low and CREADY is low, the output of gate 965 will be low. When $\overline{\text{CAS}}$ goes low, indicating either $\overline{\text{KCAS}}$ low or $\overline{\text{OPTCAS}}$ low, DLAT will go high enabling the data on $\overline{\text{DOUT0-DOUT15}}$, $\overline{\text{DOPE H}}$ and $\overline{\text{DOPE L}}$ into latches 2191 and 2192 (FIG. 9F).

Figures 1, 10:
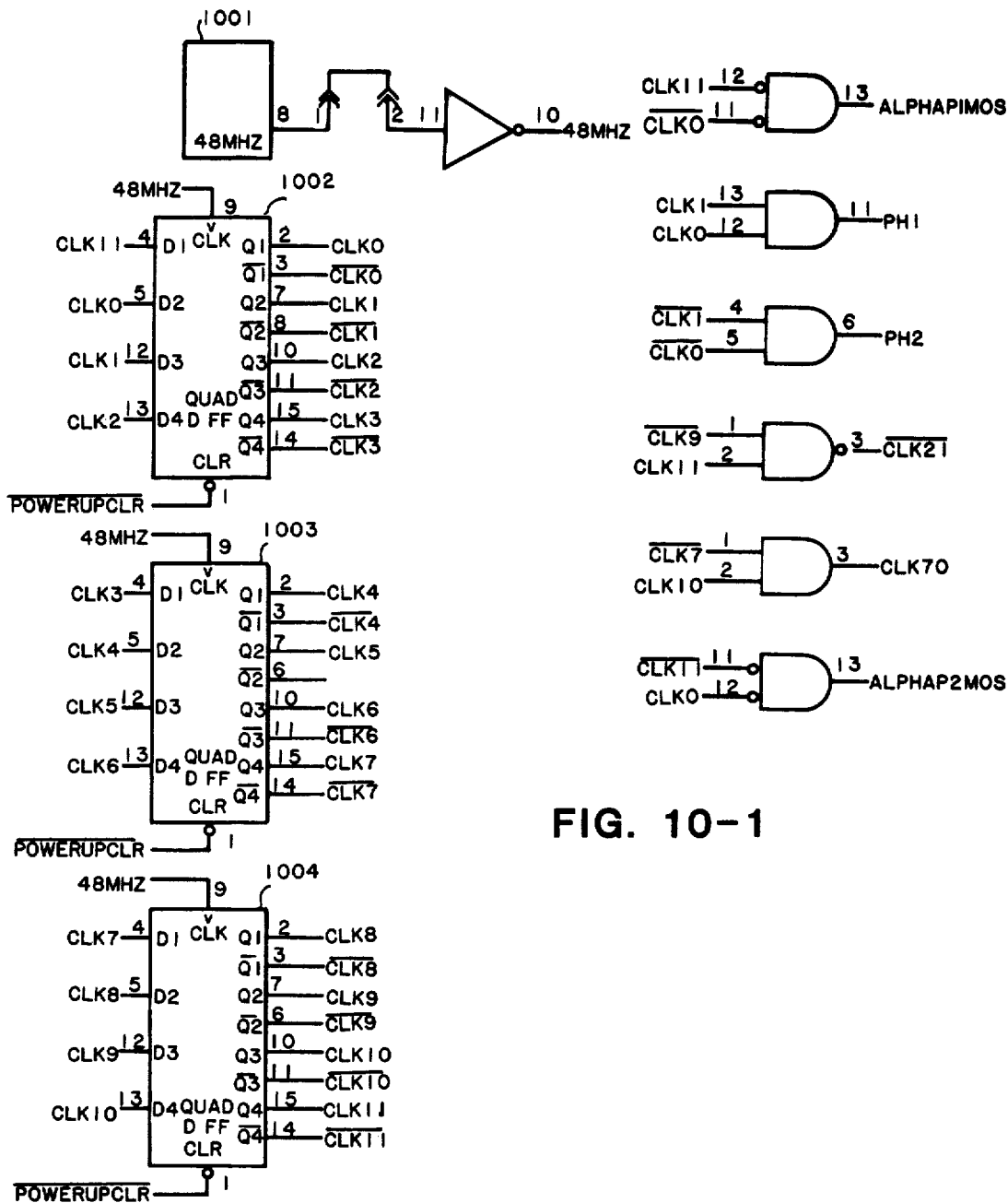
FIG. 10 shows logic circuitry for generating the timing signals of system timing 225.
Figures 2, 10:
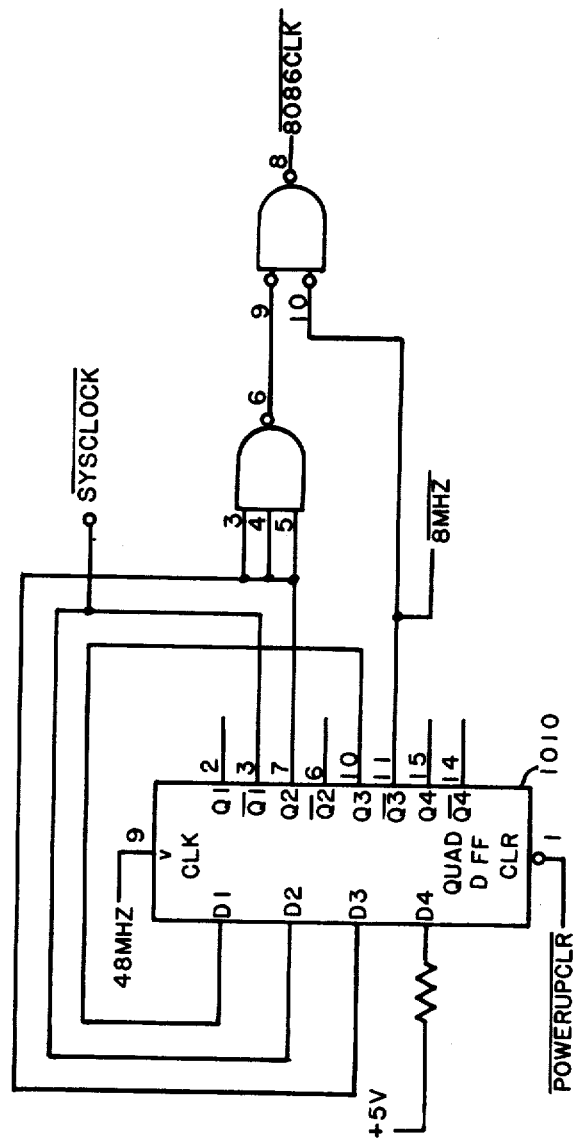
Figure 10A:
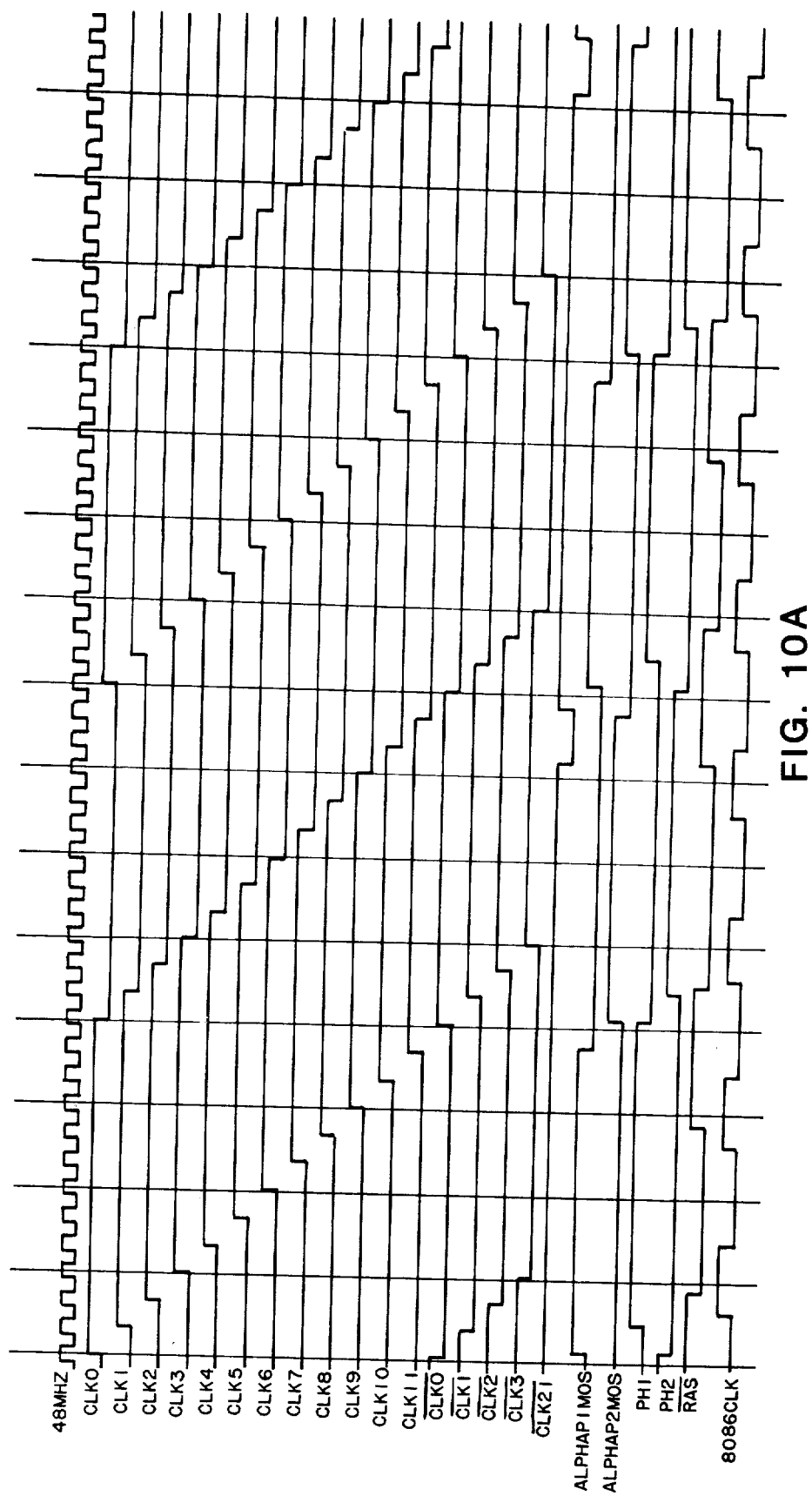
FIG. 10A shows timing diagrams for timing signals of FIG. 10.

FIGS. 10 and 10A

Logic circuitry for generating the various timing signals required throughout the system is shown in FIG. 10. Timing diagrams in FIG. 10A graphically represent selected outputs of the FIG. 10 circuitry. A 48 megahertz clock signal from oscillator 1001 is inverted and supplied to the clocking inputs of flip flops 1002–1004. The inputs and outputs of flip flops 1002–1004 are interconnected so as to cause flip flops 1002–1004 to generate twelve staggered clock signals CLK0–CLK11 and their inverse $\overline{\text{CLK0-CLK11}}$, each signal having a period of 2 MHZ (24 times the period of the 48 MHZ signal from oscillator 1001). Based on these timing signals, several other clock signals are derived. ALPHAP1-MOS goes high when $\overline{\text{CLK0}}$ goes low and returns low when $\overline{\text{CLK11}}$ goes high. ALPHAP2MOS goes high when $\overline{\text{CLK0}}$ goes low and returns low when $\overline{\text{CLK11}}$ goes high. PH1 goes high when CLK1 goes high and returns low when CLK0 goes low. PH2 goes high when $\overline{\text{CLK1}}$ goes high and returns low when $\overline{\text{CLK0}}$ goes low. $\overline{\text{CLK21}}$ goes low when $\overline{\text{CLK9}}$ goes high and returns high when CLK11 goes low. Finally, CLK70 goes high when $\overline{\text{CLK7}}$ goes high and returns low when CLK10 goes low.

FIG. 10 also shows logic circuitry for generating 8086CLK, the clocking pulse for AP106. Flip flop 1010 receives the inverted 48 MHZ signal from oscillator 1001 and has its outputs and inputs interconnected so as to yield an 8086CLK signal having a period of 8 MHZ (six times the period of the 48 MHZ signal). The clocking signals to HP101 (PH1 and PH2) therefore, have periods which are an integer multiple of the AP106 clocking signal.

Processor Coordination and Control

The system disclosed herein incorporates two processors, HP 101 and AP 106, capable of executing user programs. Since the processors share the same memory space they are constrained to run serially. That is, one processor is in an idle or hold condition while the other is running. Host processor 101 is the system "master" in the sense that HP 101 handles all I/O operations and is the processor selected upon power-up, after a system reset and upon the occurrence of an interrupt. In addition, HP 101 is activated if AP 106 terminates its processing by executing an "out" instruction or if AP 106 attempts to access a validity protected memory location. To perform its functions as host HP 101 has certain capabilities, such as control over the memory mapping operation (and therefore control over the location of the AP 106 logical address space in physical memory) and control over which memory areas are accessible to AP 106. HP 101 can also read, set and clear AP 106 "done", "busy" and "interrupt status" bits maintained in memory, can specify an AP 101 interrupt vector, and can access a hardware register containing indications of why AP 106 relinquished control (e.g. "out" instruction execution, validity protected memory access).

When AP 106 is running, it will continue to run until one of the following conditions is met: an NMI is received, an interrupt (other than an NMI) is received and interrupts are enabled, AP 106 executes an out instruction or AP 106 accesses a validity protected page. If any NMI is received, AP 106 will be held at its current point and the NMI will be handled. After it is handled, if the system was not stopped or reset by the NMI, AP 106 will be restarted at its last location. This action is totally transparent to the user. If an interrupt (other than an NMI) is received while interrupts are enabled, AP 106 is held at its current position, and HP 101 is started. The HP 101 interrupt vector sequence will be initiated, with the HP 101 interrupt return address being the HP 101 address immediately following the address of the command that last started AP 106. The interrupt handler may then return to that address in HP 101 after the interrupt(s) are handled and AP 101 may be restarted.

If AP 106 executed an out instruction, the $\overline{\text{86OUT}}$ bit will be set in the AP 106 status register, the done bit will be set high, and AP 106 will be held at that point. HP 101 will be started at the address immediately after the function that started AP 106. All information needed by HP 101 to complete whatever I/O process AP 106 was performing at the time the out signal was generated is retained by AP 106 in a set of locations in system memory termed the "context block". Since HP 101 controls the mapping of AP 106 memory, HP 101 is aware of the location of the context block and can access its contents. HP 101 then performs the I/O operation and, if required, restarts AP 106.

If AP 106 accessed a validity protected page, the $\overline{VP}$ bit is set in the AP 106 status register, the done bit will be set high, and AP 106 will be held at that point. HP 101 will be started at the address immediately after the function that started AP 106.

FIGS. 11-11I

Figure 11:
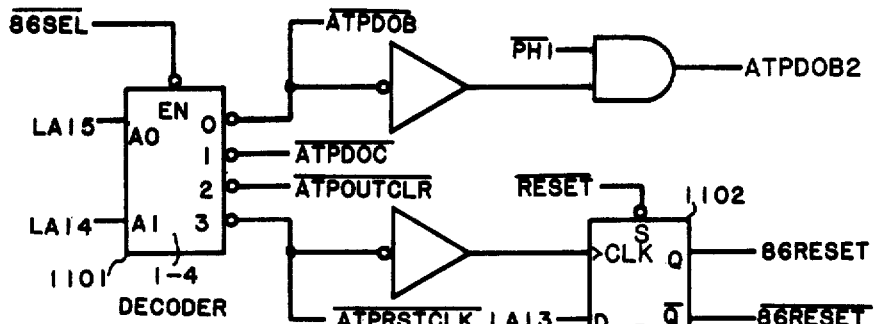
FIGS. 11 to 11I show specific logic circuitry for implementing control logic 226.
Figure 11A:
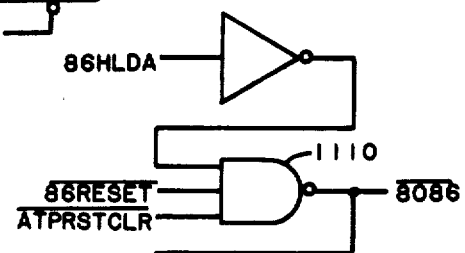
Figure 11B:
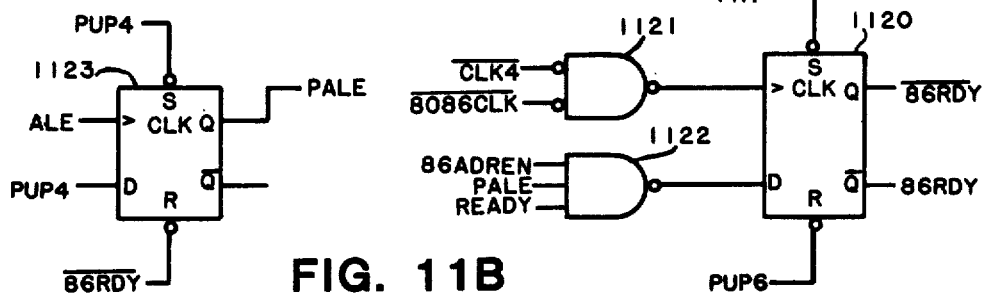
Figure 11C:
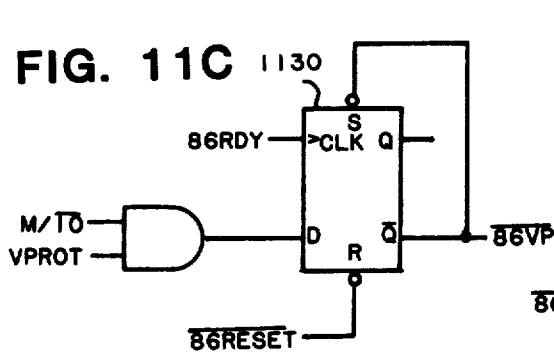
Figure 11D:
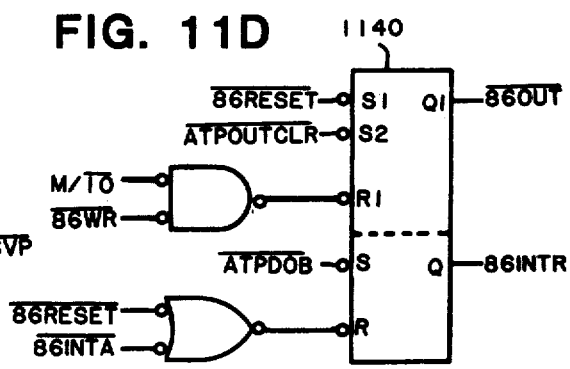
Figure 11E:
Figure 11F:
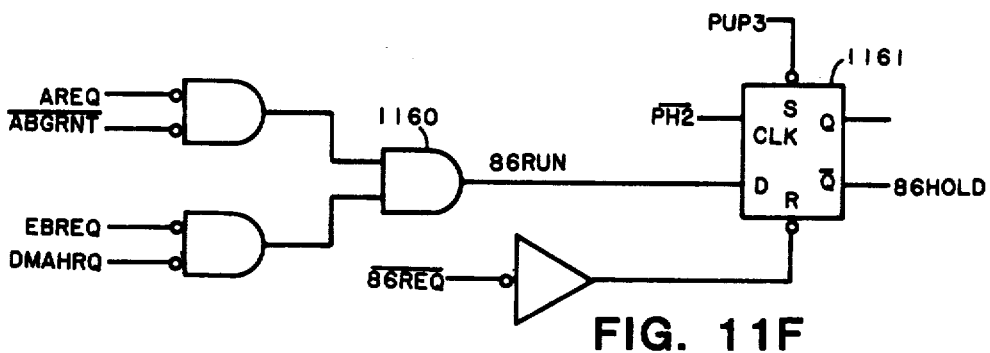
Figure 11G:
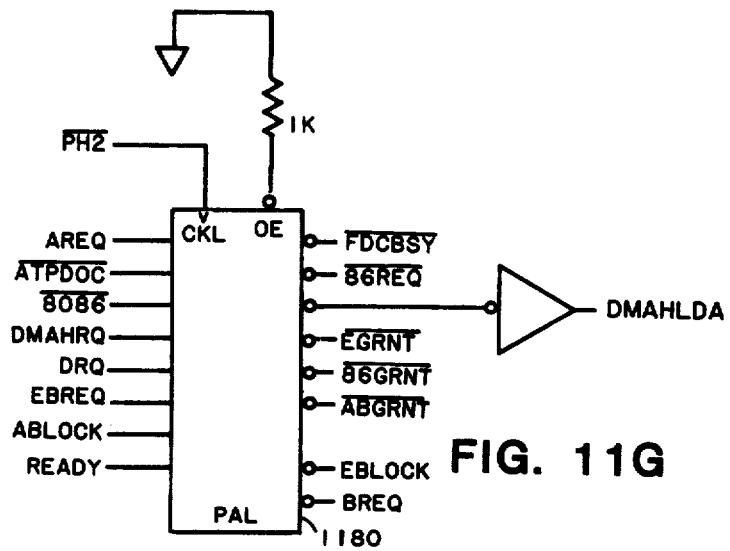
Figure 11H:
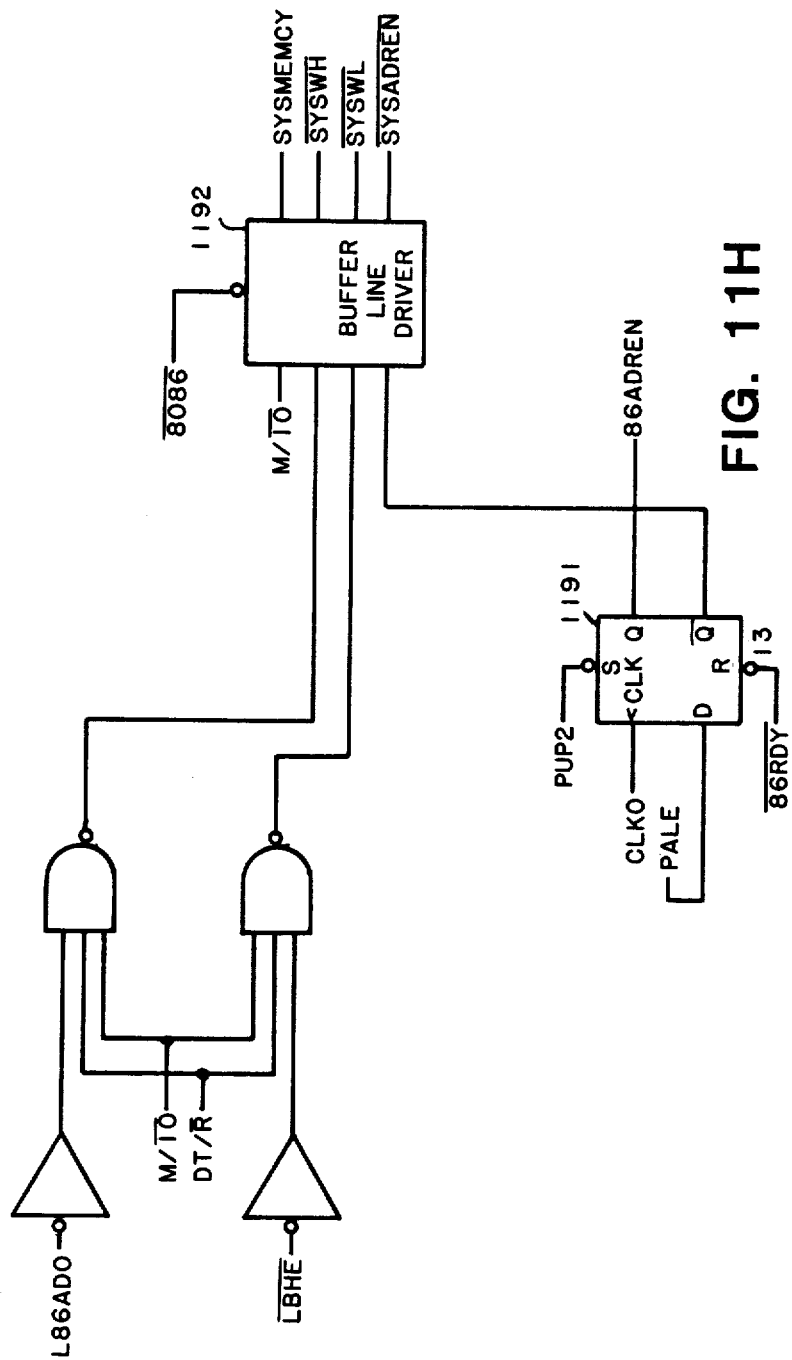
Figure 11I:
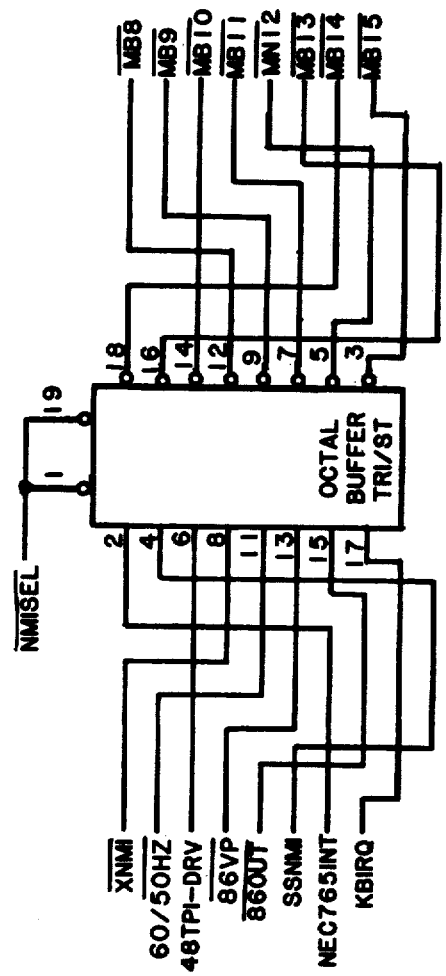

FIGS. 11 to 11I show logic to control bus access and the starting and halting of HP 101 and AP 106. Looking first at FIG. 11, decoder 1101 is enabled by $\overline{86SEL}$ from hyperspace PAL 2121, as discussed below. When decoder 1101 is enabled, LA14 and LA15 are decoded to drive either $\overline{ATPDOB}$ (AP 106 interrupt vector load), $\overline{ATPDOC}$ (AP 106 start request), $\overline{ATPOUTCLR}$ or $\overline{ATPRSTCLK}$ low. $\overline{ATPDOB}$ is provided to flip-flop 1140 (FIG. 11D) and is also inverted, ANDed with $\overline{PH1}$ to ensure that it is only asserted during PH2, and provided as the latching input to latch 208. $\overline{ATPDOC}$ is provided to bus arbitration PAL 1180, discussed below. $\overline{ATPOUTCLR}$ is also provided to flip-flop 1140 discussed below. $\overline{ATPRSTCLK}$ is inverted and used as the clocking input of flip-flop 1102. When $\overline{ATPRSTCLK}$ goes low, flip-flop 1102 is clocked and 86RESET and $\overline{86RESET}$ are set according to the state of LA13. 86RESET is provided as the RST input to AP 106. $\overline{86RESET}$ and $\overline{ATPRSTCLK}$ are also provided to gate 1110 (FIG. 11A).

In FIG. 11A, $\overline{86RESET}$ and $\overline{ATPRSTCLK}$ are nanded with the inverse of 86HLDA from AP 106 to create $\overline{8086}$, which when low indicates that AP 196 is the processor which is currently running. 8086 is provided as the output enabling signal to latches 2091-2093 (FIG. 5), to the output enabling logic of latch 206 (FIG. 4), to bus arbitration PAL 1180 (FIG. 11G) and to buffer line driver 1192 (FIG. 11H). The inverse, $\overline{8086}$, is provided to multiplexer 2010 (FIG. 6).

In FIG. 11B, to synchronize the starting of AP 106 with HP 101 timing, 86RDY (ready signal to AP 106) is held low during PH1. During PH2, the clocking of flip flop 1120 is constrained to occur only when both $\overline{CLK4}$ and $\overline{8086CLK}$ are low. 86RDY will be driven high only if 86ADREN (from FIG. 11H), PALE (pended ALE) and READY are high at the time flip-flop 1120 is clocked. PALE is generated by flip-flop 1123, which is clocked by the rising edge of ALE. When $\overline{86RDY}$ is low, PALE is held low. $\overline{86RDY}$ will be high either when PH1 is high or when flip-flop 1120 is clocked and all inputs to gate 1122 are not high. When $\overline{86RDY}$ is high, PALE is driven high at the rising edge of ALE. Therefore, during PH2, 86RDY will be driven high at the first clocking pulse to flip-flop 1120 after ALE has returned low.

Looking now at FIG. 11C, 86RDY is supplied as the clocking input to flip-flop 1130. When 86RDY goes high, if M/$\overline{IO}$ is high, indicating a memory access, and VPROT is high, indicating a validity protected page is being accessed, $\overline{86VP}$ will be driven low.

As was discussed above, one of the ways AP 106 turns over control to host processor 101 is by an "out" operation. Since AP 106 does not directly control any I/O, an attempt by AP 106 to perform an output operation is interpreted as an "out" request. In FIG. 11D, $\overline{86OUT}$ is driven low when M/$\overline{IO}$ and $\overline{86WR}$ are both low, indicating an output write condition. $\overline{86OUT}$ is driven high by either an $\overline{86RESET}$ or an ATPOUTCLR (out clear) signal from flip-flop 1102. Flip-flop 1140 also generates 86INTR, the AP 106 interrupt request signal. 86INTR is driven high by $\overline{ATPDOB}$ from decoder 1101 (FIG. 11). 86 INTR is driven low either by an attached processor reset, $\overline{86RESET}$, from flip-flop 1102 or by the interrupt acknowledge signal, $\overline{86\ INTA}$, from AP 106 going low, indicating the interrupt request has been acknowledged.

AP106, once started, will continue to run until one of four conditions is met: (1) a CPU 201 non-maskable interrupt is received, indicated by $\overline{NMI}$ going low, (2) an interrupt (other than a non-maskable interrupt) is received and interrupts are enabled indicated by $\overline{INTRQ}$ (interrupt request from SIO 202 and $\overline{INTEN}$ (interrupts enabled) both being low, (3) an "out" instruction was executed by AP 106, indicated by $\overline{86OUT}$ going low, or (4) AP 106 accessed a validity protected page, indicated by $\overline{86VP}$ going low. Logic for generating AREQ, which indicates one of the above four conditions has occurred, is shown in FIG. 11E. AREQ will cause AP 106 to halt and CPU 201 to become active. AREQ is provided to 86RUN logic (FIG. 11F) and bus arbitration PAL 1180 (FIG. 11G).

Looking at FIG. 11F, if AP 106 is running, any one of four signals going high will cause AP 106 to enter a hold mode, indicated by 86HOLD going high. AREQ has been discussed above. 86REQ going high, indicates neither CPU 201 nor AP 106 is requesting that AP 106 have control of the system bus. EBREQ going high, indicates SIO 202 is requesting control of the bus. DMAHRQ going high, indicates FDC 220 is requesting control of the bus, the output of gate 1160 will go low and, at the next $\overline{PH2}$ rising edge, 86HOLD will be driven high. $\overline{ABGRNT}$ low indicates CPU 201 has granted control of the bus system to another device. This signal operates as a condition which must be met to start AP 106, rather than a cause of AP 106 halt.

In FIG. 11G, bus arbitration logic 1180 is the source of $\overline{ABGRNT}$, $\overline{86REQ}$, and EBLOCK and BREQ. Logic 1180 is implemented as a PAL having as inputs AREQ (FIG. 11F), $\overline{ATPDOC}$ (FIG. 11A), $\overline{8086}$ (FIG. 11B), DMAHRQ (from DMA 221), DRQ (from FDC 220), $\overline{EBREQ}$ (from SIO 202), and READY and ABLOCK (from CPU 201). The logic statements for generating the outputs from the inputs are given in Table 3, wherein an asterisk indicates a logical AND operation and a plus sign indicates a logical OR operation.

TABLE 3

Outputs clocked by ALPHAP2MOS:

ARGRNT =
  READY * $\overline{ABLOCK}$ * BREQ * $\overline{ARGRNT}$
  +BREQ * ABGRNT AT6GRNT =
  READY * $\overline{ABLOCK}$ * DRQ * AT6HLDA * $\overline{AT6GRNT}$
  +READY * $\overline{ABLOCK}$ * EBREQ * AT6HLDA * $\overline{AT6GRNT}$
  +DRQ * AT6GRNT
  +EBREQ * AT6GRNT EGRNT =
  READY * $\overline{ABLOCK}$ * DMAHRQ * AT6HLDA * $\overline{EGRNT}$
  +DMAHRQ * EGRNT TABLE 3-continued

```
DMAHLDA =
    READY * ABLOCK * DMAHRQ * EGRNT *
        AT6HLDA * DMAHLDA * DRQ
    +DRQ * DMAHLDA

AT6REQ =
    ATPDOC * AT6REQ
    + AT6HLDA * AT6REQ
    +AT6HLDA * AT6REQ * AREQ

FDCBSY =
    READY* ABLOCK * DMAHRQ * EBREQ *
        AT6HLDA * DMAHLDA * DRQ
    +DMAHRQ * DMAHLDA
```

Combinatorial Outputs:

$\overline{BREQ} = \overline{AT6REQ} * \overline{EBREQ} * \overline{DMAHRQ}$ $\overline{EBLOCK} = \overline{ABLOCK} * AT6HLDA * \overline{FDCBSY}$ FIG. 11H shows the logic for generating SYSMEMCY (memory cycle indicator), $\overline{SYSWH}$ (write high byte), $\overline{SYSWL}$ (write low byte) and $\overline{SYSADREN}$ (address enable) when AP 106 has bus control, indicated by $\overline{8086}$ being low. When buffer line driver 1192 is enabled by $\overline{8086}$ low, SYSMEMCY has the same state as M/$\overline{IO}$ from AP 106. $\overline{LBHE}$ low, from latch 2093, indicates that a byte is to be transferred onto the most significant byte (86AD8–86AD15) of the data bus. L86AD0 is analogous to $\overline{LBHE}$ for the lower byte (data on 86AD0–86AD7). Therefore, if M/$\overline{IO}$ is high, indicating a memory operation, and DT/$\overline{R}$ is high, indicating a data transmission, L86AD0 low will result in $\overline{SYSWH}$ low and $\overline{LBHE}$ low will result in $\overline{SYSWL}$ low. The meanings of $\overline{SYSWH}$ and $\overline{SYSWL}$ are reversed when AP 106 is active because the 8086 processor used in this embodiment uses a different byte organization scheme. If $\overline{86RDY}$ is low, indicating the AP 106 data transmission is not completed, $\overline{SYSADREN}$ will be held high by the output of flip flop 1191. As discussed above, PALE is held low by $\overline{86RDY}$ low. When $\overline{86RDY}$ returns high, PALE will go high at the next ALE (from AP 106) rising edge. At the next CLK8 rising edge after the ALE pulse, $\overline{SYSADREN}$ will be driven low.

FIG. 11I show three-state buffer 1195 which operates as a status register. Status of $\overline{86VP}$ and $\overline{86OUT}$ is read from this register by HP 101.

The invention may be embodied in yet other specific forms without departing from the spirit or essential characteristics thereof. For example, the techniques and apparatus described herein can be adapted to handle a host processor and a plurality of attached processors.

The present embodiments are therefore to be considered in all respects as illustrative and not restrictive. The scope of the invention is indicated by the appended claims rather than by the foregoing description, and all changes which come within the meaning can range of equivalency are therefore intended to be embraced therein.

We claim:

1. In a data processing system having a first processor, a second processor, a memory, and bus means interconnecting the first processor, the second processor and the memory, a method for controlling which of said processors is active on said bus means, said method comprising the steps of:

(a) if said first processor is currently active, monitoring for a start command from said first processor to said second processor;

(b) if said start command to said second processor is detected, holding said first processor and starting said second processor;

(c) if said second processor is currently active, monitoring for an interrupt condition and monitoring for an attempt by said second processor to perform an input/output operation;

(d) if an interrupt condition is detected while said second processor is active, holding said second processor, starting said first processor and handling said interrupt condition;

(e) if an attempt by said second processor to perform an input or output operation is detected, holding said second processor, starting said first processor and performing the input or output operation;

(f) repeating steps (a)-(e).

2. The method of claim 1 further comprising the steps of (a) said first processor identifying certain locations in said memory which are protected from access by said second processor;

(b) if said second processor is active, monitoring for an attempt by said second processor to access a portion of said protected memory locations; and (c) if an attempt by said second processor to access a portion of said protected memory locations is detected, holding said second processor and starting said first processor.

3. A data processing system comprising:
memory means;
first processor means, said first processor means having means for executing computer programs under a first operating system and means for controlling all input and output operations of said data processing system;
second processor means, said second processor means having means for executing computer programs under a second operating system;
input/output device interface means;
bus means, connected to said memory means, said input/output device interface means, said first processor and said second processor; for transferring at least data and addresses and
control means, connected to said first processor and said second processor, and said bus means for controlling which of said processors is allowed access to said bus means, said control means including
means for detecting an input or output request by said second processor,
means for holding said second processor when said second processor requests an input or output operation, and
means for starting said first processor when said second processor requests an input or output operation.

4. The data processing system of claim 3, further comprising:
means controlled by said first processor for mapping the logical addresses of said first processor and said second processor into the physical address space of said memory means; and
means controlled by said first processor for identifying portions of said memory means as being protected from access by said second processor.

5. The data processing system of claim 4, wherein said control means further comprises
   means for detecting an attempt by said second processor to access a protected area of memory;
   means, responsive to said memory access attempt detecting means, for holding said second processor and
   means, responsive to said memory access attempt detecting means, for starting said first processor.

6. The apparatus of claim 3 wherein said bus control means further comprises:
   means responsive to a command from said first processor for resetting said second processor;
   means responsive to a command from said first processor for starting said second processor;
   means responsive to a command from said first processor for holding said second processor;
   means for allowing access to said bus means by said first processor when said first processor is active;
   means for precluding access to said bus means by said second processor when said first processor is running;
   means for allowing access to said bus means by said second processor when said second processor is active and;
   means for precluding access to said bus means and said memory means by said first processor when said second processor is running.

7. The data processing system of claim 3 wherein said control means further comprises
   means for monitoring processor interrupt conditions when said second processor is active,
   means, responsive to said interrupt condition monitoring means, for holding said second processor when an interrupt condition is detected and
   means for starting said first processor when a processor interrupt condition is detected by said interrupt condition monitoring means.

8. A data processing system comprising;
   memory means;
   first and second processors, said first processor including
      means for running a first operating system,
      means for processing all system input and output operations,
      means for handling all system interrupts,
      means for generating hold commands to said second processor and
      means for generating start commands to said second processor,
   and said second processor means including means for running a second operating system;
   bus means, connected to said memory means, said first processor and said second processor, for transferring at least data and addresses between said first processor and said memory and between said second processor and said memory;
   control means, connected to said first processor, said second processor and said bus means, said control means including
      means for detecting an attempt by said second processor to perform an input or output operation,
      means, responsive to said detecting means, for holding said second processor,
      means, responsive to said detecting means, for starting said first processor,
      means, responsive to a hold command from said first processor, for holding said second processor, and
      means, responsive to a start command from said first processor, for starting said second processor.

9. The data processing system of claim 8, wherein said first processor also includes means for identifying certain portions of said memory as being protected from access by said second processor and wherein said control means also includes:
   means for detecting an attempt by said second processor to access said protected portions of said memory,
   means, responsive to said access detecting means, for holding said second processor and
   means, responsive to said access detecting means, for starting said first processor.

* * * * *